United States Patent
Ahn et al.

(10) Patent No.: US 8,862,165 B2
(45) Date of Patent: Oct. 14, 2014

(54) MOBILE TERMINAL AND CONTROLLING METHOD THEREOF

(75) Inventors: Seung Kwon Ahn, Seoul (KR); Jae Do Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 953 days.

(21) Appl. No.: 12/637,682

(22) Filed: Dec. 14, 2009

(65) Prior Publication Data
US 2010/0151890 A1    Jun. 17, 2010

(30) Foreign Application Priority Data

Dec. 15, 2008   (KR) .................. 10-2008-0127377
Dec. 22, 2008   (KR) .................. 10-2008-0131120

(51) Int. Cl.
| | |
|---|---|
| *H04W 4/00* | (2009.01) |
| *H04W 4/12* | (2009.01) |
| *H04M 1/725* | (2006.01) |
| *H04W 4/14* | (2009.01) |
| *H04L 12/58* | (2006.01) |

(52) U.S. Cl.
CPC ............ *H04M 1/72547* (2013.01); *H04W 4/12* (2013.01); *H04W 4/14* (2013.01); *H04L 12/5895* (2013.01)
USPC ..... 455/466; 455/566; 455/412.1; 455/412.2; 709/206; 709/207; 715/204; 715/200; 715/255; 715/256; 715/243; 715/269; 715/273; 345/418; 345/581; 345/689

(58) Field of Classification Search
CPC ....... H04W 4/14; H04W 4/12; H04I 12/5895; H04L 1/72547
USPC ............... 455/466, 566, 412.1, 414.1, 412.2; 709/206–207; 345/418, 581, 689; 715/204, 200, 255, 256, 243, 269, 273
See application file for complete search history.

(56) References Cited

U.S. PATENT DOCUMENTS

| | | | |
|---|---|---|---|
| 2003/0222909 A1 | 12/2003 | Long et al. | |
| 2004/0008723 A1* | 1/2004 | Uchida et al. | ................. 370/466 |

(Continued)

FOREIGN PATENT DOCUMENTS

CN           101277333           10/2008

OTHER PUBLICATIONS

European Patent Office Application Serial No. 09015446.9, Search Report dated Jun. 5, 2013, 7 pages.

*Primary Examiner* — Khalid Shaheed
(74) *Attorney, Agent, or Firm* — Lee, Hong, Degerman, Kang & Waimey

(57) ABSTRACT

A mobile terminal and controlling method thereof are disclosed, by which a message can be sent in a manner that necessary information is contained in the message according to a configuration of the mobile terminal, a data volume of the message, a recipient of the message and/or the like.

The present invention includes a wireless communication unit configured to send a message stipulated to limit a data space to which data can be inputted by a user, a display unit configured to display the message, a memory configured to store at least two user informations previously set, a user input unit configured to input the message, and a control unit controlling one of the at least two user informations to be selected according to a size of an empty space of the data space in sending the message after completion of writing the message, the control unit controlling the selected user information to be sent by being contained in the data space of the message.

15 Claims, 37 Drawing Sheets

(56) References Cited

U.S. PATENT DOCUMENTS

| | | |
|---|---|---|
| 2005/0097463 A1* | 5/2005 | Yu .................................. 715/531 |
| 2006/0149825 A1* | 7/2006 | Kim ............................... 709/207 |
| 2006/0168027 A1 | 7/2006 | Doan et al. |
| 2006/0288219 A1* | 12/2006 | Adams et al. ................. 713/176 |
| 2007/0174629 A1* | 7/2007 | Suominen ..................... 713/182 |
| 2007/0260975 A1* | 11/2007 | Nordenhake .................. 715/520 |
| 2008/0268884 A1* | 10/2008 | Lee ................................ 455/466 |
| 2009/0061910 A1* | 3/2009 | Garba ............................ 455/466 |
| 2009/0075699 A1* | 3/2009 | Griffith et al. ................. 455/558 |
| 2009/0158200 A1* | 6/2009 | Palahnuk et al. .............. 715/781 |
| 2009/0176521 A1* | 7/2009 | Klassen et al. ................ 455/466 |
| 2009/0305682 A1* | 12/2009 | Spalink ....................... 455/414.3 |
| 2011/0099607 A1* | 4/2011 | Cohen ............................... 726/3 |

* cited by examiner

FIG. 13
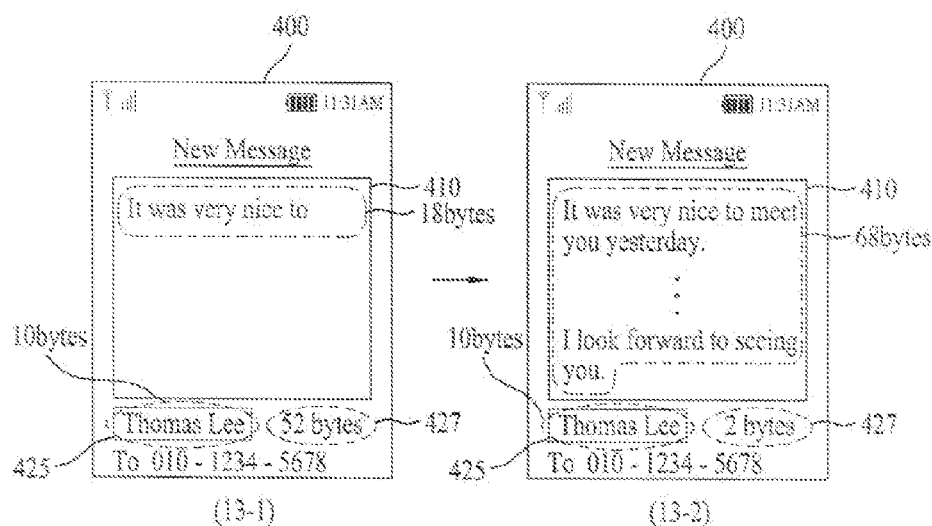
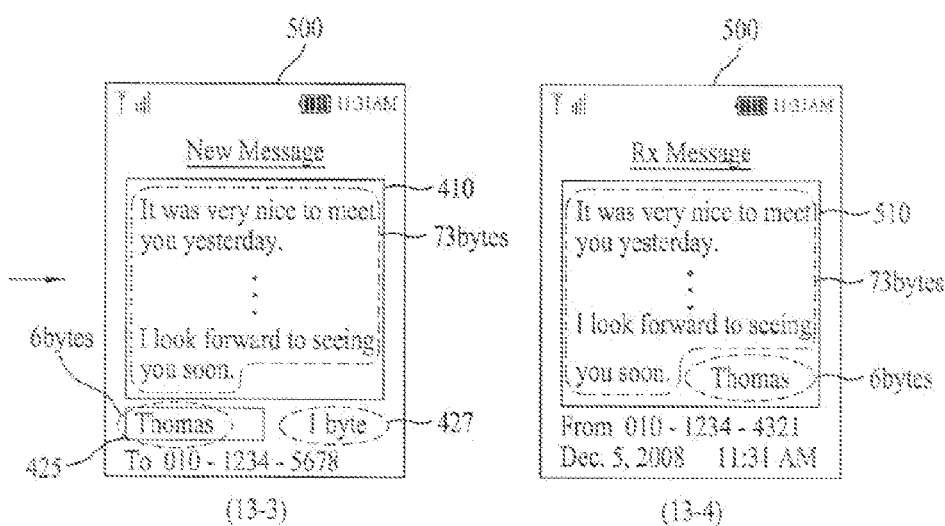

FIG. 25
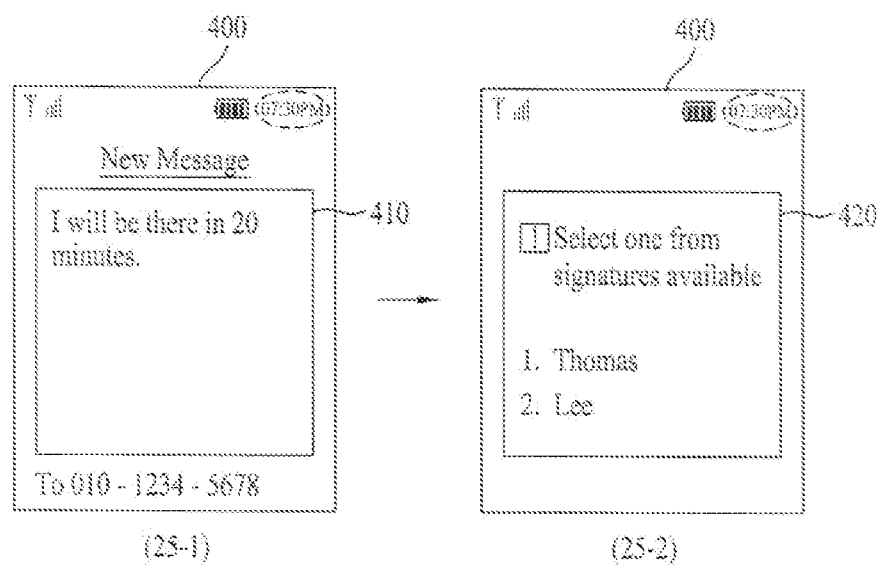
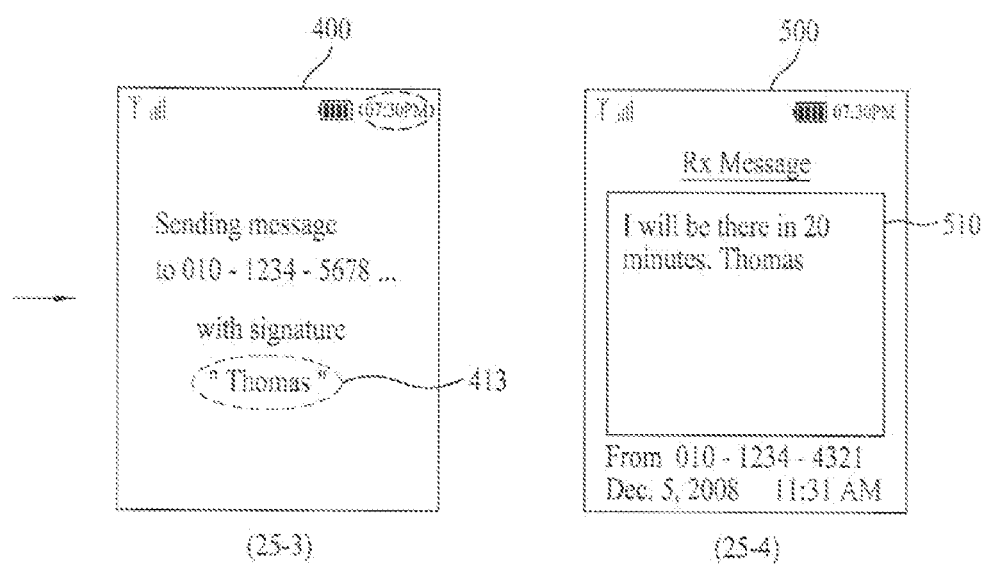

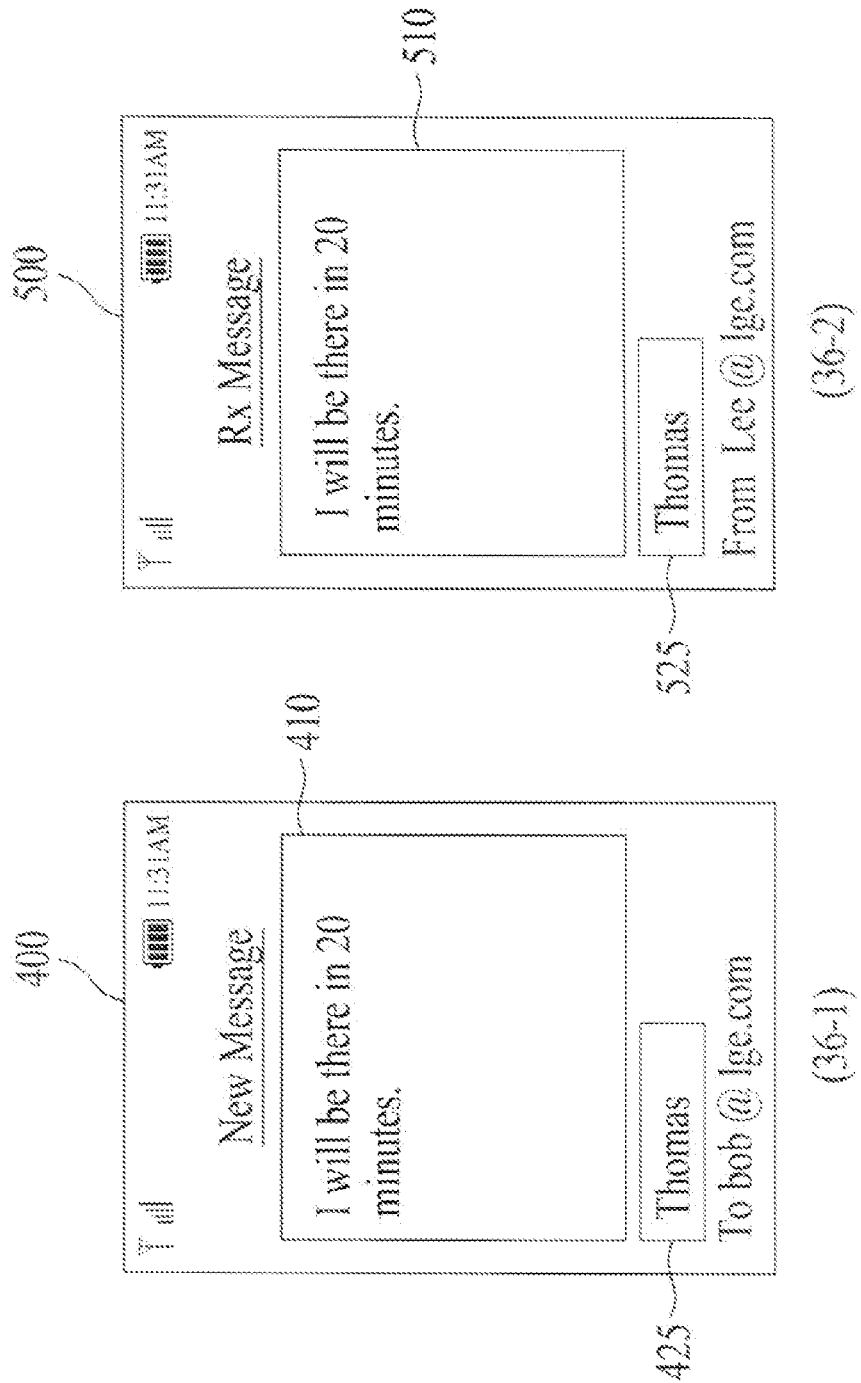

MOBILE TERMINAL AND CONTROLLING METHOD THEREOF

Pursuant to 35 U.S.C. §119(a), this application claims the benefit of earlier filing date and right of priority to Korean Application Nos. 10-2008-0127377, filed on Dec. 15, 2008, and 10-2008-0131120 filed on Dec. 22, 2008, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for implementing a use of the terminal by further considering user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, messages are frequently exchanged through mobile terminals by users. Theses messages can include a short text message, a multimedia message, an instant message, an e-mail, etc. Therefore, the demand for a method of sending a message in a manner of facilitating necessary information to be contained in the message keeps rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a message can be sent in a manner that necessary information is contained in the message according to a configuration of the mobile terminal, a data volume of the message, a recipient of the message and/or the like.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit configured to send a message stipulated to limit a data space to which data can be inputted by a user, a display unit configured to display the message, a memory configured to store at least two user informations previously set, a user input unit configured to input the message, and a control unit controlling one of the at least two user informations to be selected according to a size of an empty space of the data space in sending the message after completion of writing the message, the control unit controlling the selected user information to be sent by being contained in the data space of the message.

In another aspect of the present invention, a mobile terminal according to the present invention includes a wireless communication unit configured to send a message having a data space to which data can be inputted by a user, a display unit configured to display the message, a memory configured to store a phonebook having correspondent parties categorized into groups and at least two user informations previously set, a user input unit configured to input the message, and a control unit controlling one of the at least two user informations to be selected according to the group to which the correspondent party of the message belongs in sending the message after completion of writing the message, the control unit controlling the selected user information to be sent by being contained in the data space of the message.

In another aspect of the present invention, a mobile terminal according to the present invention includes a wireless communication unit configured to send a message having a data space to which data can be inputted by a user in a manner of accessing at least one of at least two communication networks, a display unit configured to display the message, a memory configured to store at least two user informations previously set, a user input unit configured to input the message, and a control unit controlling one of the at least two user informations to be selected according to the accessed communication network in sending the message after completion of writing the message, the control unit controlling the selected user information to be sent by being contained in the data space of the message.

In another aspect of the present invention, a mobile terminal according to the present invention includes a wireless communication unit configured to send a message having a data space to which data can be inputted by a user, a display unit configured to display a first region and a second region discriminated from each other, a memory configured to store user information previously set for the message, a user input unit configured to input the message, and a control unit controlling the inputted message to be displayed on the first region in inputting the message, the control unit controlling the user information to be displayed on the second region.

In another aspect of the present invention, a method of controlling a mobile terminal according to the present invention includes the steps of writing a message stipulated to limit a data space to which data can be inputted by a user, selecting one of at least two user informations previously set according to a size of an empty space of the data space, and sending the selected user information in a manner that the selected user information is contained in the data space when the written message is sent.

In another aspect of the present invention, a method of controlling a mobile terminal according to the present invention includes the steps of writing a message having a data space to which data can be inputted by a user, selecting one of at least two user informations previously set according to a group to which a correspondent party of the message belongs, and sending the selected user information in a manner that the selected user information is contained in the data space when the written message is sent.

In another aspect of the present invention, a method of controlling a mobile terminal according to the present invention includes the steps of writing a message having a data space to which data can be inputted by a user, selecting one of at least two user informations previously set according to a communication network to be accessed, and sending the selected user information in a manner that the selected user information is contained in the data space when the written message is sent.

In another aspect of the present invention, a method of controlling a mobile terminal according to the present invention includes the steps of displaying a first region and a second region discriminated from each other, inputting a message having a data space to which data can be inputted by a user, and displaying the inputted message and the user information on the first region and the second region, respectively.

In another aspect of the present invention, a mobile terminal according to the present invention includes a wireless communication unit configured to send a message having a data space to which a message text can be inputted by a user, a display unit configured to display the message, a memory configured to store user information previously set for the message, a user input unit configured to input the message text, and a control unit controlling a text type of the user information to be determined in consideration of a text type of the inputted message text in sending the message in a manner that the user information is contained in the data space together with the inputted message text.

In another aspect of the present invention, a mobile terminal according to the present invention includes a wireless communication unit configured to send a message having a data space to which a message text can be inputted by a user, a display unit configured to display the message, a memory configured to store user information previously set for the message, a user input unit configured to input the message text, and a control unit controlling the user information to become a background of the inputted message text in sending the message in a manner that the user information is contained in the data space together with the inputted message text.

In another aspect of the present invention, a mobile terminal according to the present invention includes a wireless communication unit configured to send a message having a data space to which a message text can be inputted by a user, a display unit configured to display the message, a memory configured to store user information previously set for the message, a user input unit configured to input the message text, and a control unit controlling the inputted message text to be sent by dividing the inputted message text into at least two messages, the control unit controlling the user information to be sent in a manner of being included in the data space of each of the at least two messages or the data space of one of the at least two messages.

In another aspect of the present invention, a mobile terminal according to the present invention includes a wireless communication unit configured to send a message having a message text and user information previously set by a correspondent party located in a data space by being discriminated from each other, a display unit configured to display a first region and a second region discriminated from each other, and a control unit controlling the message text and the user information in the received message to be displayed on the first region and the second region, respectively.

In another aspect of the present invention, a method of controlling a mobile terminal according to the present invention includes the steps of writing a text of a message having a data space to which a message text can be inputted by a user and if user information previously set is contained in the data space to send the message, determining a text type of the user information in consideration of a text type of the written message text.

In another aspect of the present invention, a method of controlling a mobile terminal according to the present invention includes the steps of writing a text of a message having a data space to which a message text can be inputted by a user and if user information previously set is contained in the data space to send the message, controlling the user information to become a background of the inputted message text.

In another aspect of the present invention, a method of controlling a mobile terminal according to the present invention includes the steps of writing a text of a message having a data space to which a message text can be inputted by a user and if the written message text is sent by being divided into at least two messages, controlling user information previously set to be contained in the data space of each of the at least two messages or the data space of one of the at least two messages.

In a further aspect of the present invention, a method of controlling a mobile terminal according to the present invention includes the steps of receiving a message having a message text and user information previously set by a correspondent party located in a data space by being discriminated from each other and displaying the message text and the user information in the received message to be displayed on a first region and a second region of a display unit, respectively.

In another aspect, a mobile terminal includes a wireless communication unit configured to send a message inputted by a user, the data size for the message being limited, a memory configured to store at least two user data items, a display configured to display the message, an input unit configured to input the message, and a controller configured to select one of the at least two user data items to be added to the message according to remaining data space. The controller selects the user data item of the largest size that is the same size or smaller than the remaining data space. The user data items may be message originator identification data. The at least two user data items may differ from each other in data size. The controller may be further configured to automatically select one of the user data items at the completion of creation of the message and to insert the selected user data item into the message. The controller may be further configured to display on the display a list of user data items that are the same size or smaller than the remaining data space at the completion of the creation of the message, to select one of the user data items from the list, and to insert the selected user data item into the message. The controller may be further configured to receive a determination from a user of whether to send the message with the user data item inserted in the message. The controller may be further configured to not insert one of the user data items into the message if the remaining data space is smaller than each of the user data items, and may also be configured to inform the user that no user data item is contained in the message. The controller may be further configured to automatically select one of the user data items during creation of the message based on the remaining data space and to insert the selected user data item into the message during the creation of the message. The display may include a first region and a second region, and the controller may be further configured to display the message in the first region of the display and to display the selected user data item in the second region of the display.

In another aspect, a mobile terminal includes a wireless communication unit configured to send a message inputted by a user, the message having a data size, a memory configured to store a phonebook including correspondent parties, the correspondent parties being categorized into groups, and further configured to store at least two user data items, a display configured to display the message, an input unit configured to input the message, and a controller configured to select one of the at least two user data items to be added to the message based on the group to which a receiving correspondent party of the message belongs, and to insert the selected user data item into the message. The user data items may be message originator identification data. The data size of the message may be limited, and the controller may be further configured to select the user data item of the largest size that is the same size or smaller than the remaining data space when there are at least two user data items corresponding to the group to which the receiving correspondent party of the message belongs.

In another aspect, a mobile terminal includes a wireless communication unit configured to send a message inputted by a user, the message having a data size, and further configured to access at least one of a plurality of communication networks, a memory configured to store at least two user data items, a display configured to display the message, an input unit configured to input the message, and a controller configured to select one of the at least two user data items to be added to the message based on which of the communication networks is accessed. The user data items may be message originator identification data. The data size for the message may be limited, and the controller may be further configured to select the user data item of the largest size that is the same size or smaller than the remaining data space when there are at least two user data items corresponding to the accessed communication network.

In another aspect, a mobile terminal includes a wireless communication unit configured to send a message inputted by a user, a display configured to display the message, the display having a first region and a second region separate from the first region, a memory configured to store a user data item, an input unit configured to input the message, and a controller configured to display the inputted message in the first region of the display and to display the user data item in the second region of the display.

In another aspect, a method of controlling a mobile terminal includes storing at least two user data items in a memory, creating a message having a limited data size, selecting one of the at least two user data items via a controller according to remaining data space, and the controller selecting the user data item of the largest size that is the same size or smaller than the remaining data space, and sending the message with the selected user data item contained therein.

In another aspect, a method of controlling a mobile terminal includes storing at least two user data items in a memory, storing a phonebook in the memory, the phonebook including correspondent parties that are categorized into groups, creating a message having a data size, selecting one of the at least two user data items according to a group to which the receiving correspondent party of the message belongs, and sending the message with the selected user data item contained therein.

In another aspect, a method of controlling a mobile terminal includes storing at least two user data items in a memory, creating a message having a data size, selecting one of the at least two user data items according to a communication network to be accessed, and sending the message with the selected user data item contained therein.

In another aspect, a method of controlling a mobile terminal includes storing a user data item in a memory, creating a message having a data size, and displaying the message in a first display region of a display and displaying the data item in a second display region of the display that is separate from the first display region of the display.

In another aspect, a mobile terminal includes a wireless communication unit configured to send a message inputted by a user, a memory configured to store a user data item, a display configured to display the message, an input unit configured to input the message, and a controller configured to select a text type for the user data item according to a text type of the inputted message and for sending the message with the user data item contained therein. The selected text type for the user data item may include at least one of a text font, a text color or a text size. The controller may be further configured to select the text type of the user data item to match the text type of the inputted message text. If the inputted message includes at least two text types, the controller may be further configured to select the text type of the user data item to match the text type occupying a majority of the message text. The controller may be further configured to select the text type for the user data item to differ from the text type of the inputted message text. If the inputted message includes at least two text types, the controller may be further configured to select the text type of the user data item to differ from either the text type occupying a majority of the message text or all of the at least two text types of the inputted message.

In another aspect, a mobile terminal includes a wireless communication unit configured to send a message inputted by a user, the message having a data size, a memory configured to store a user data item, a display configured to display the message, an input unit configured to input the message, and a controller configured to insert the user data item as a background to the inputted message. The user data item may include text, and the controller may be further configured to convert the text of the user data item to an image inserted as the background of the inputted message.

In another aspect, a mobile terminal includes a wireless communication unit configured to send a message inputted by a user, the message having a data size, a memory configured to store a user data item, a display configured to display the message, an input unit configured to input the message, and a controller configured to divide the inputted message into a plurality of messages and to send the plurality of messages with the user data item included in at least one of the plurality of messages. The controller may be further configured to divide the inputted message when the inputted message exceeds a predetermined size. The controller may be further configured to insert the user data item in the last message of the plurality of messages. The controller may be further configured to insert the user data item in each of the plurality of messages.

In another aspect, a mobile terminal includes a wireless communication unit configured to receive data from a correspondent party, the data including a message inputted by the correspondent party and a user data item related to the correspondent party, a display configured to display the received data, the display having a first region and a second region separate from the first region, and a controller configured to display the message inputted by the correspondent party in the first region of the display and to display the user data item in the second region of the display. The display may include a first display and a second display, and the controller may be further configured to display the first display region on the first display and to display the second display region on the second display.

In another aspect, a method of controlling a mobile terminal includes storing a user data item in a memory, creating a message having a data size and a text type, displaying the message on a display, selecting a text type for the user data item via a controller according to a text type of the message, and sending the message with the user data item contained therein.

In another aspect, a method of controlling a mobile terminal includes storing a user data item in a memory, creating a message having a data size, displaying the message on a display, inserting the user data item as a background to the created message via a controller when sending the message, and sending the message with the user data item contained therein.

In another aspect, a method of controlling a mobile terminal includes storing a user data item in a memory, creating a message having a data size, displaying the message on a display, dividing the message into a plurality of messages via a controller, and sending the plurality of messages with the user data item included in at least one of the plurality of messages.

In another aspect, a method of controlling a mobile terminal includes receiving data from a correspondent party via a wireless communication unit, the data including a message inputted by the correspondent party and a user data item related to the correspondent party, displaying the received data on a display, the display having a first region and a second region separate from the first region, and displaying the message inputted by the correspondent party in the first region of the display and displaying the user data item in the second region of the display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8 to 13 are diagrams of state configurations of a display screen on which a method of controlling a mobile terminal according to a first embodiment of the present invention is implemented;

FIGS. 23 to 25 are diagrams of state configurations of a display screen on which a method of controlling a mobile terminal according to a fourth embodiment of the present invention is implemented;

FIG. 36 is a diagram of state configurations of a display screen on which a method of controlling a mobile terminal according to an eighth embodiment of the present invention is implemented.

DETAILED DESCRIPTION OF THE INVENTION

Reference will now be made in detail to the preferred embodiments of the present invention, examples of which are illustrated in the accompanying drawings.

It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
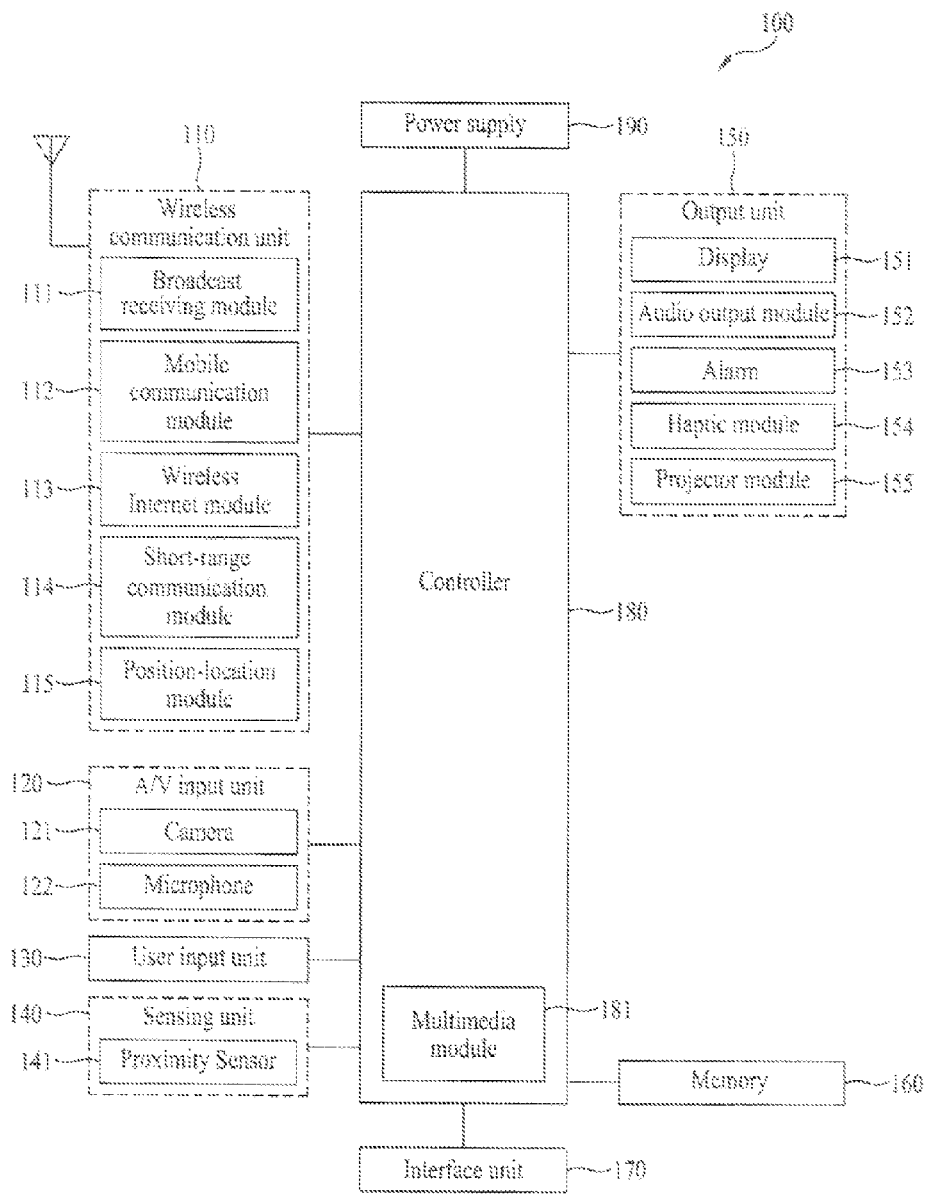
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The mobile communication module 112 is directly accessible to the mobile communication network or is indirectly accessible to the mobile communication network via a wireless private branch exchange (WPBX).

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 155.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, preset information, which has been previously set to be inserted in a short text message, a multimedia message, an instant message, an e-mail message or the like, can be stored in the memory 160. The preset information shall be explained later.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
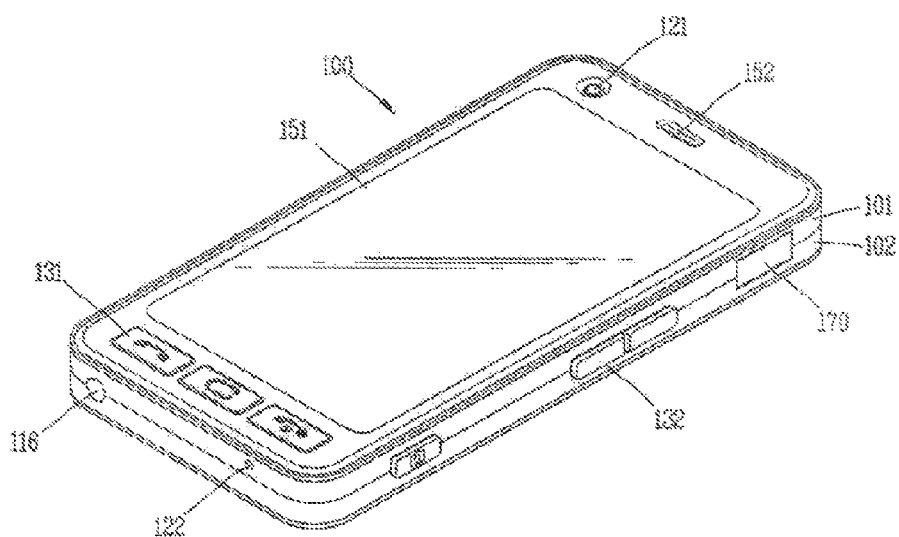
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
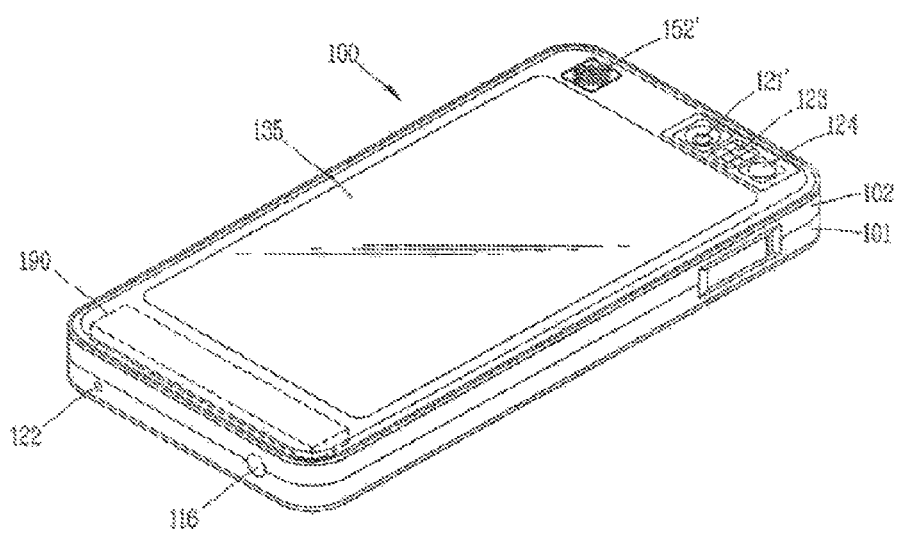
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Interconnected operational mechanism between the display 151 and the touchpad 135 are explained with reference to FIG. 3A and FIG. 3B as follows.

Figure 3A:
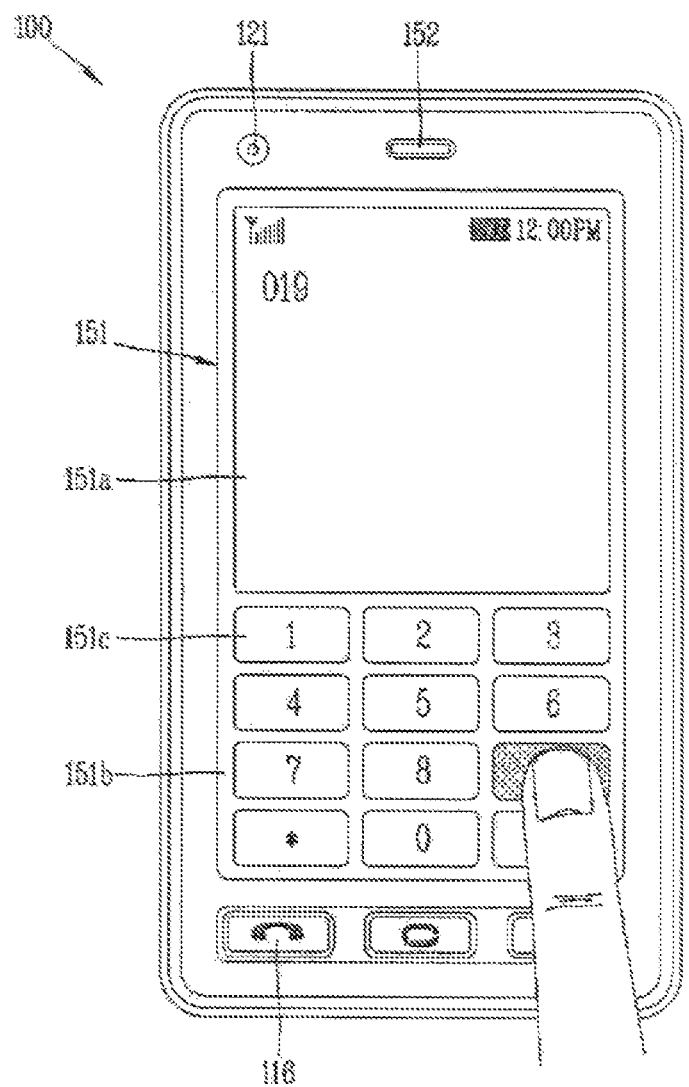
FIG. 3A and FIG. 3B are front diagrams of a mobile terminal according to one embodiment of the present invention for explaining one operational status of the mobile terminal, respectively.
Figure 3B:
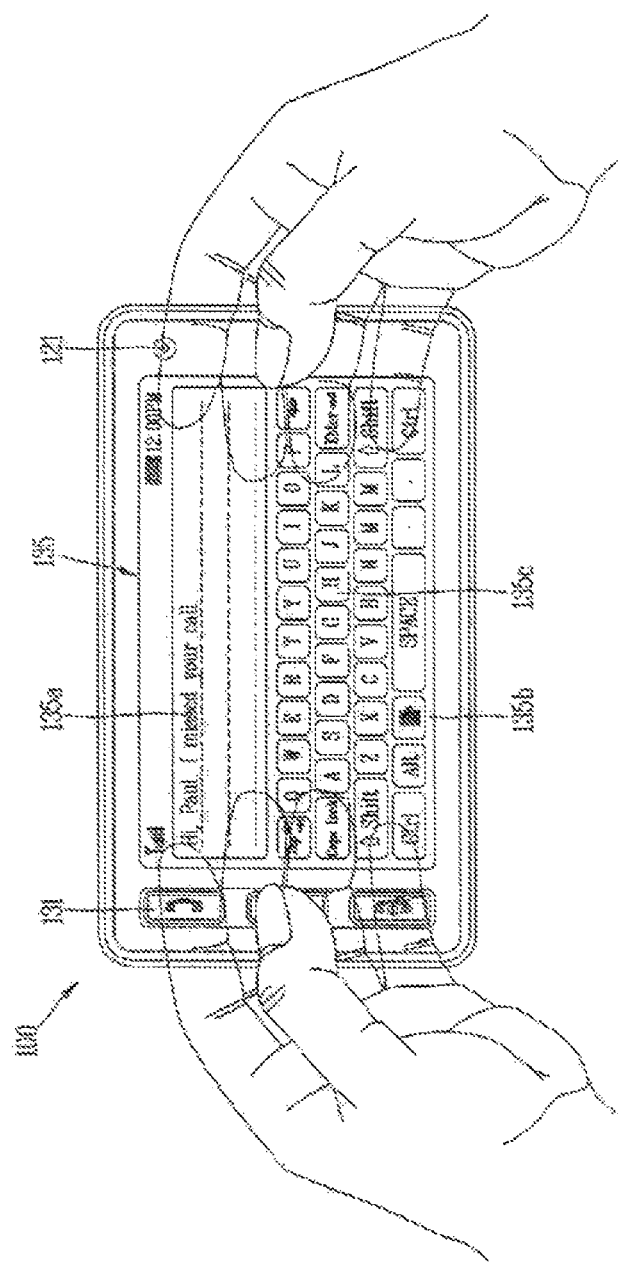

FIG. 3A and FIG. 3B are front-view diagrams of a terminal according to one embodiment of the present invention for explaining an operational state thereof.

First of all, various kinds of visual informations can be displayed on the display 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3A shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display 151 can be configured to change an output picture according to the arranged direction of the terminal body.

FIG. 3B shows that a text input mode is activated in the terminal.

An output window 151a' and an input window 151b' are displayed on the display 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad (cf. '135' in FIG. 2B), the characters, symbols and digits corresponding to the touched soft keys are outputted to the output window 151a'. Thus, the touch input via the touchpad 135 is advantageous in that the soft keys 151c' can be prevented from being blocked by a finger in case of touch, which is compared to the touch input via the display 151. In case that the display 151 and the touchpad 135 are configured transparent, it is able to visually check fingers located at the backside of the terminal body. Hence, more correct touch inputs are possible.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

The proximity sensor 141 described with reference to FIG. 1 is explained in detail with reference to FIG. 4 as follows.

Figure 4:
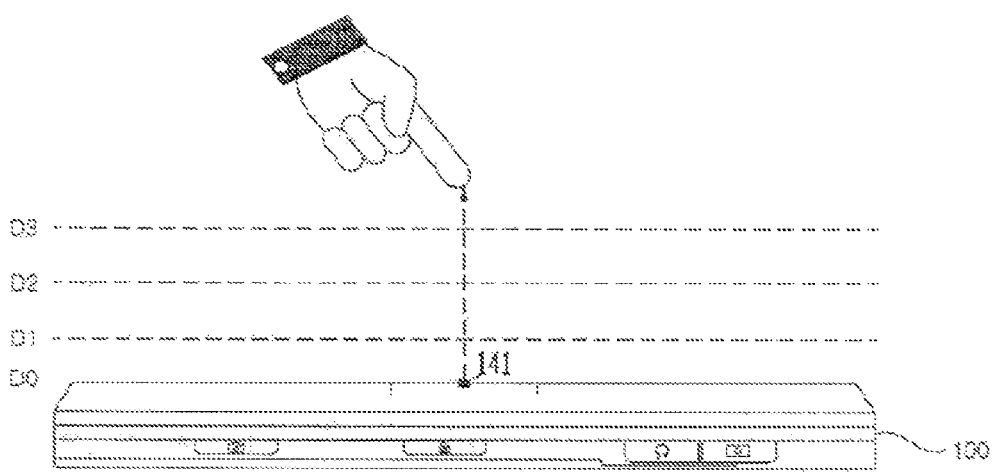
FIG. 4 is a diagram to explain the concept of proximity depth of a proximity sensor.

FIG. 4 is a conceptional diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth).

In FIG. 4, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 5A:
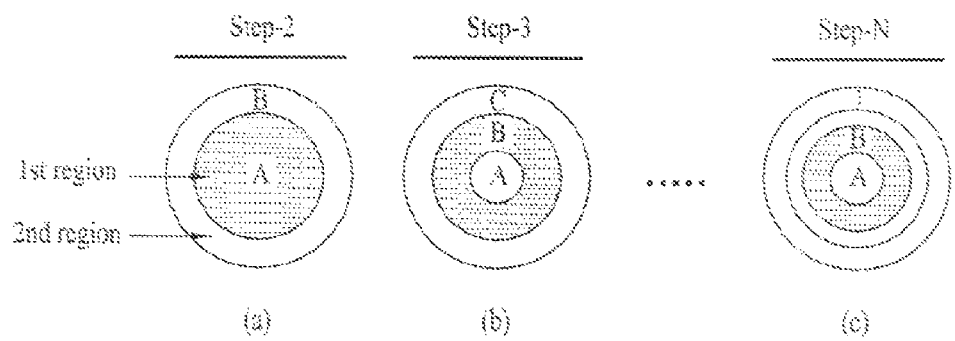
FIG. 5A and FIG. 5B are diagrams to explain the concepts of a proximity touch recognizing area for detecting a proximity signal and a haptic area for generating a tactile effect, respectively.
Figure 5B:
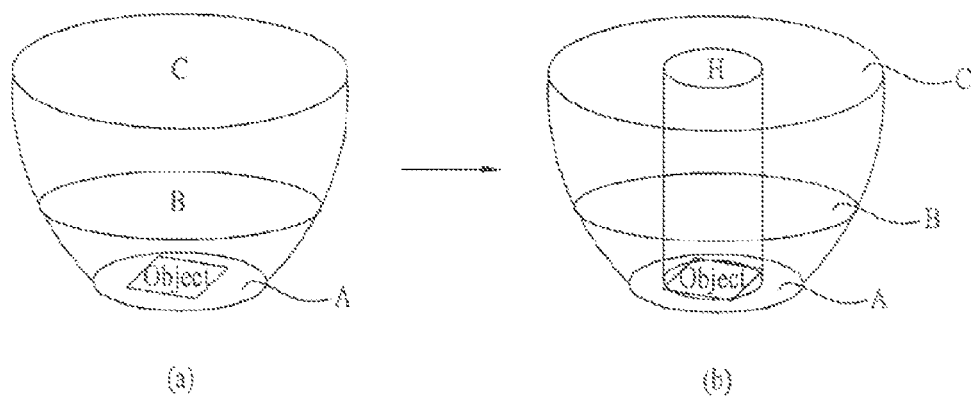

FIG. 5A and FIG. 5B are diagrams for the description of a proximity touch recognition area and a tactile effect generation region.

FIG. 5A represents such an object as an icon, a menu item and the like in a circle type for clarity and convenience of explanation.

A region for displaying an object on the display 151, as shown in (a) of FIG. 5A, can be divided into a first region A at a central part and a second region B enclosing the first region A. The first and second regions A and B can be configured to generate tactile effects differing from each other in strength or pattern. For instance, the firs and second regions can be configured to generate 2-step vibrations in a manner of outputting a first vibration if the second region B is touched or outputting a second vibration greater than the first vibration if the first region A is touched.

In case that both of the proximity touch recognition region and the haptic region are simultaneously set in the region having the object displayed therein, it is able to set the haptic region for generating the tactile effect to be different from the proximity touch recognition region for detecting the proximity signal. In particular, it is able to set the haptic region to be narrower or wider than the proximity touch recognition region. For instance, in (a) of FIG. 5A, it is able to set the proximity touch recognition region to the area including both of the first and second regions A and B. And, it is able to set the haptic region to the first region A.

It is able to discriminate the region having the object displayed therein into three regions A, B and C as shown in (b) of FIG. 5A. Alternatively, it is able to discriminate the region having the object displayed therein into N regions (N>4) as shown in (c) of FIG. 5A. And, it is able to configure each of the divided regions to generate a tactile effect having a different strength or pattern. In case that a region having a single object represented therein is divided into at least three regions, it is able to set the haptic region and the proximity touch recognition region to differ from each other according to a use environment.

It is able to configure a size of the proximity touch recognition region of the display 151 to vary according to a proximity depth. In particular, referring to (a) of FIG. 5B, the proximity touch recognition region is configured to decrease by C→B→A according to the proximity depth for the display 151. On the contrary, the proximity touch recognition region is configured to increase by C→B→A according to the proximity depth for the display 151. Despite the above configuration, it is able to set the haptic region to have a predetermined size, as the region 'H' shown in (b) of FIG. 5B, regardless of the proximity depth for the display 151.

In case of dividing the object-displayed region for the setting of the haptic region or the proximity touch recognition region, it is able to use one of various schemes of horizontal/vertical division, radial division and combinations thereof as well as the concentric circle type division shown in FIG. 5A.

In the following description, the configuration of the above-described projector module provided to the bar type mobile terminal 100 is explained in detail with reference to FIG. 6A and FIG. 6B.

Figure 6A:
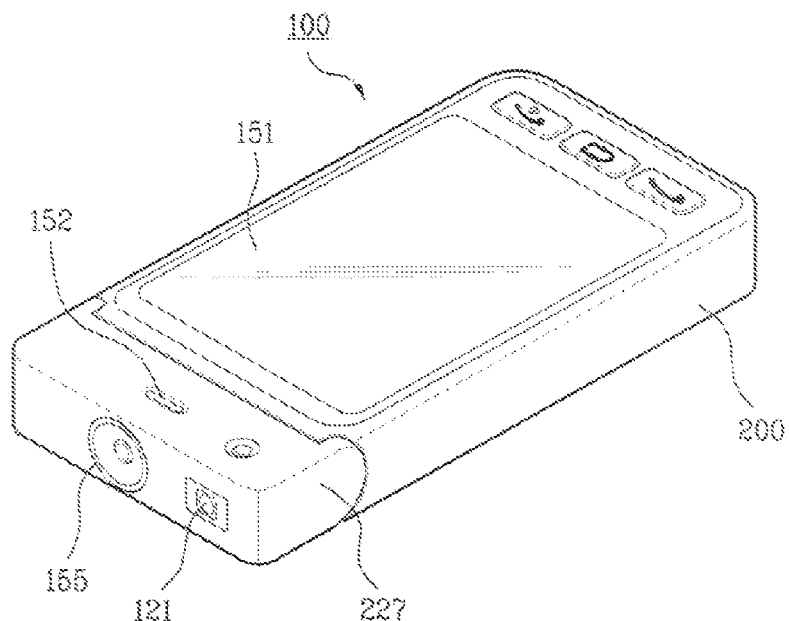
FIG. 6A and FIG. 6B are perspective diagrams of a mobile terminal according to one embodiment of the present invention.
Figure 6B:
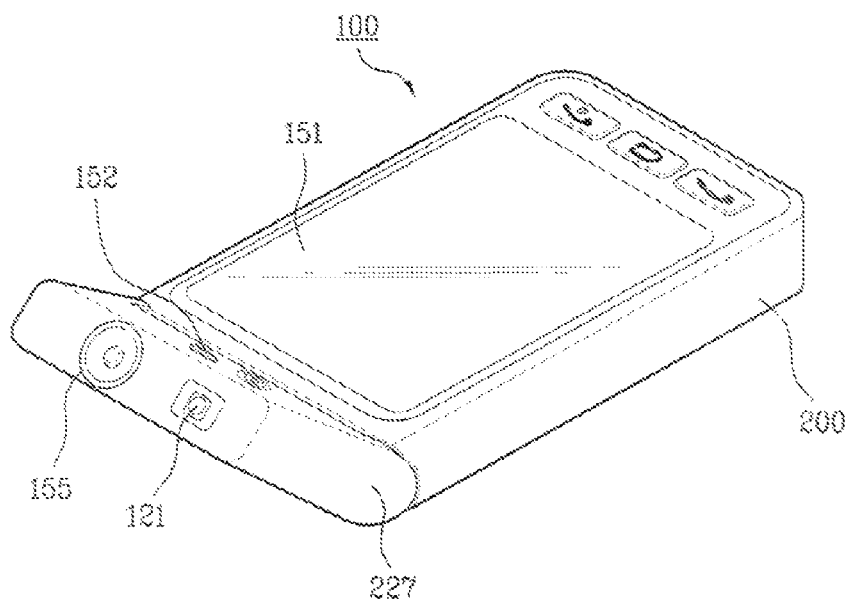

FIG. 6A and FIG. 6B are perspective diagrams of a mobile terminal according to one embodiment of the present invention.

Referring to FIG. 6A, a projector body 105 having a projector module 155 can be rotatably coupled to a main body 101 of the mobile terminal.

In particular, the projector body 105 can be hinged to the main body 103. A projected angle of an image, which is projected using the projector module 155 provided to the projector body 105, can be controlled. And, a camera 121 can be provided to the projector body 105 to photograph the image projected by the projector module 155.

FIG. 6A shows a status before the projector body 105 rotatably coupled to the main body 103 is rotated, and FIG. 6B shows a status after the projector body 105 has been rotated.

In the following description, embodiments relating to a control method configured to be implemented in the above-configured mobile terminal are explained in detail with reference to the accompanying drawings. And, it is understandable that the following embodiments are usable independently or in a manner of being combined with one another.

In the following description, a display screen of the display 151 of the output unit 150 will be indicated by a reference number '400'.

First Embodiment

A method of controlling a mobile terminal according to a first embodiment of the present invention is explained with reference to FIGS. 7 to 13 as follows.

Figure 7:
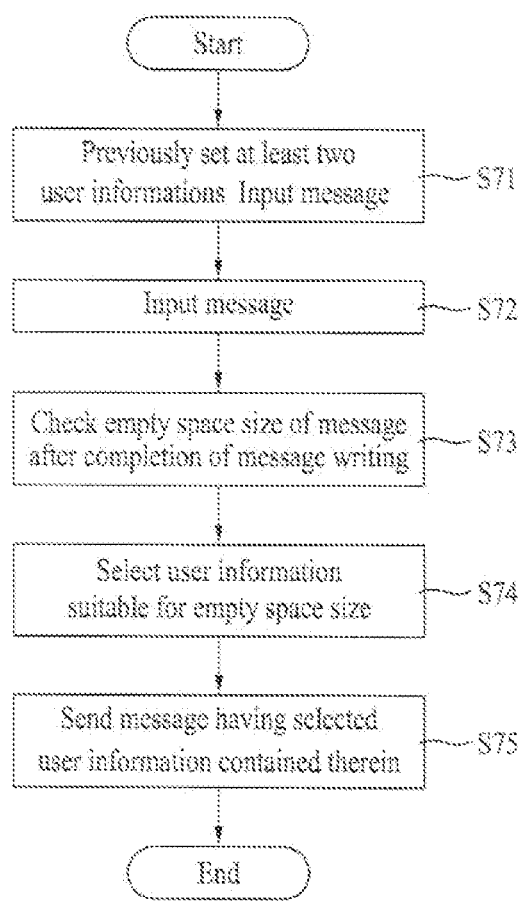
FIG. 7 is a flowchart for a method of controlling a mobile terminal according to a first embodiment of the present invention.

FIG. 7 is a flowchart for a method of controlling a mobile terminal according to a first embodiment of the present invention, and FIGS. 8 to 13 are diagrams of state configurations of a display screen on which a method of controlling a mobile terminal according to a first embodiment of the present invention is implemented.

User information, which can be contained in a message in case of message transmission, can be previously set in the mobile terminal 100 [S71].

For instance, the user information can include identification information of a user of the mobile terminal 100 (i.e., identification information of an originator), and more particularly, information for enabling a recipient of a message to identify an originator of a message (e.g., a name or signature of the originator). Yet, the user information is non-limited to the originator identification information. Hence, if a terminal user attempt to have other contents (e.g., such a greeting as 'thank you', etc.) contained in the message according to the taste of the terminal user, the contents can be included in the user information.

The user information can be configured as a text. Yet, if the message can include a multimedia content (for example, an audio, a still picture, a moving picture) as a multimedia message, an instant message, an e-mail message and the like does, it is understood that the user information may include one of an audio, a still picture and a moving picture or a combination thereof.

In the following description, how to set the user information in the mobile terminal 100 is described with reference to FIG. 8.

First of all, the mobile terminal 100 enters a menu for setting the user information. It is apparent to those skilled in the art that this entry into the user information setting menu can be performed by an appropriate manipulation of the user input unit 130 of the mobile terminal 100. Details of the entry are omitted from the following description for clarity of this disclosure.

Figure 8:
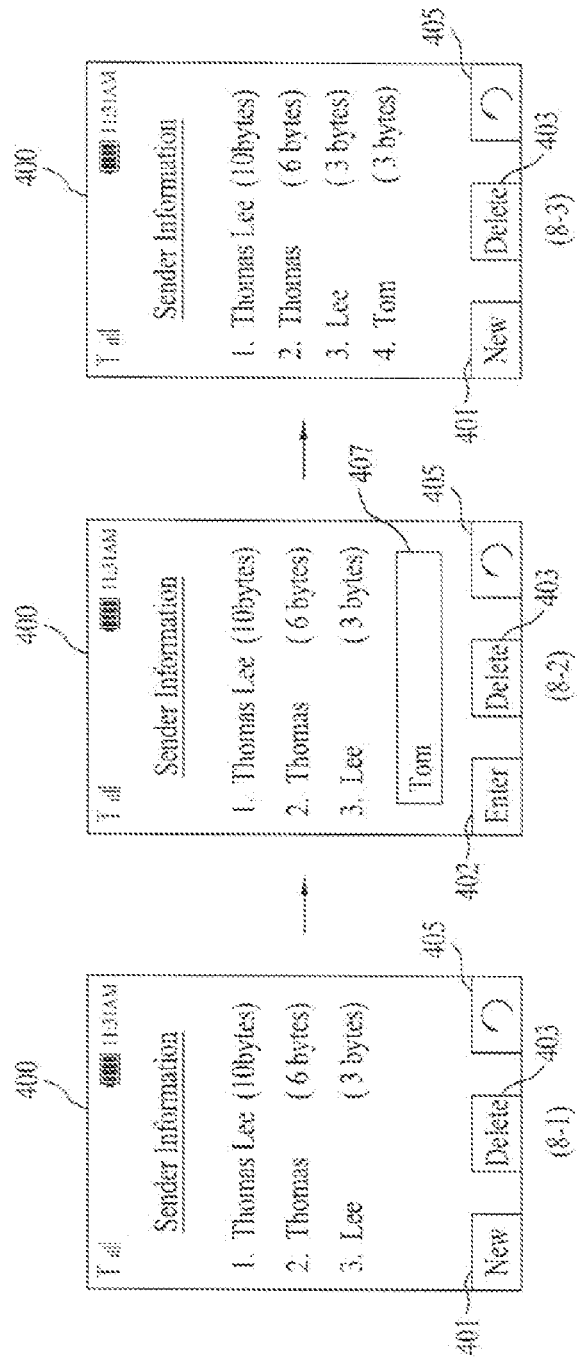

Once the user information setting menu is entered, referring to (8-1) of FIG. 8, preset user information ("Thomas Lee", "Thomas", "Lee"), which was set previously, can be displayed on the display unit 400. The preset user information is displayable with its size (e.g., byte size). Optionally, the user information can be displayed only.

Subsequently, a command for initiating a setting of new user information in the mobile terminal 100 is inputted via the user input unit 130. In (8-1) of FIG. 8, exemplarily shown is that the command for initiating the setting of the new user information is inputted in a manner of displaying an icon 401 for a new user information setting initiation and then selecting the setting initiation icon 401.

After the command for the new user information setting has been inputted, a terminal user is able to input specific information via the user input unit 130. In doing so, the inputted user information can be displayed via a user information input window 407 of the display unit 400.

After completion of the input of the user information, a command for completing the setting of the new user information in the mobile terminal 100 is inputted via the user input unit 180. In (8-2) of FIG. 8, exemplarily shown is that the command for completing the new user information setting is inputted in a manner of displaying an icon 402 for new user information setting completion on the display unit 400 and then selecting the setting completion icon 402.

If so, the presetting of the inputted user information is completed. Referring to (8-3) of FIG. 8, the presetting-completed user information ("Tom") can be displayed on the display unit 400.

In the following description, a method of utilizing the preset user information is explained.

First of all, a first embodiment assumes that the message has a communication protocol pre-regulated to put limitation on a data space in which data (e.g., a message text) is inputable by a user. As a representative example for the message having this protocol, there can be a short text (SMS) message. Yet, instead being limited to the short text message, the present embodiment is applicable to any kind of message having a pre-regulated communication protocol to have the data space limited.

In the following description, assume that the message is a short text message. And, assume that a data space, to which data is inputable by a user, amounts to 80 bytes.

The mobile terminal 100 enters a message menu. Subsequently, a terminal user inputs or selects a message correspondent party. Since it is apparent to those skilled in the art that the entry into the message menu or the input or selection of the message correspondent party can be performed by an appropriate manipulation of the user input unit 130 of the mobile terminal 100, corresponding details shall be omitted from the following description for clarity of this disclosure.

Subsequently, a text of the short text message is inputted via the user input unit 140 in the mobile terminal 100 [S72].

Figure 9:
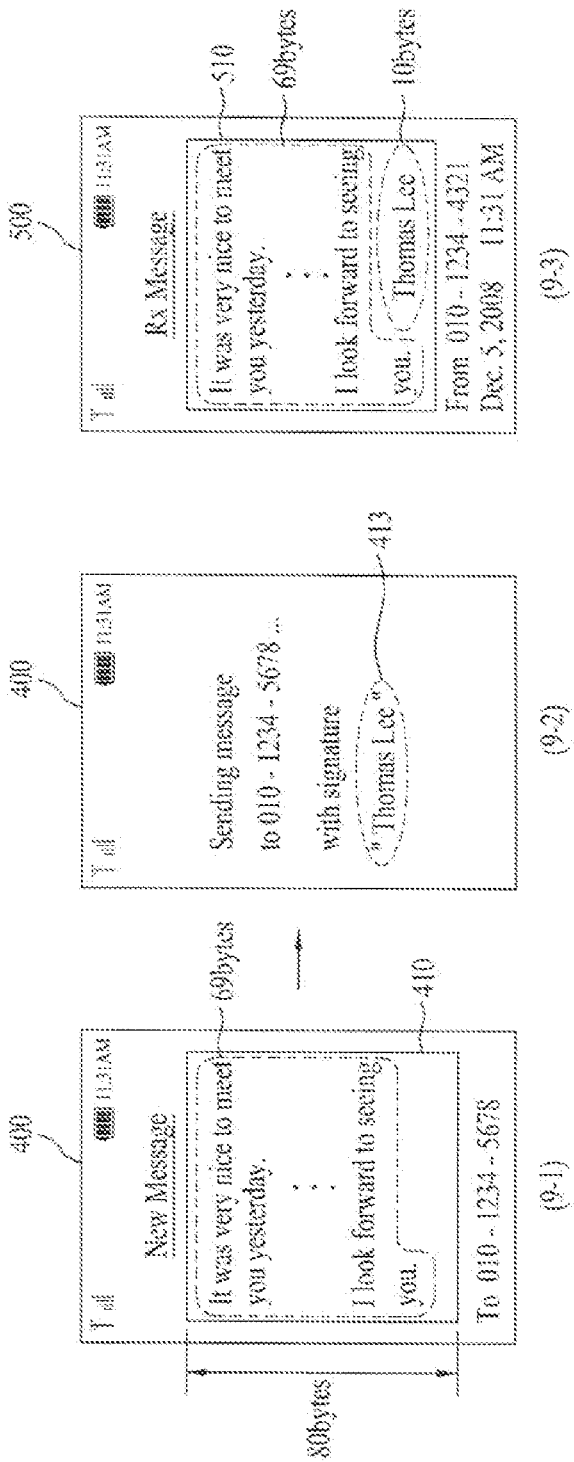

If so, referring to (9-1) of FIG. 9, the inputted message text is displayed on a message input window 410 of the display unit 400.

After completion of the message text input, a command for sending the message is inputted via the user input unit 140. In this case, assume that a data size of the input-completed message text amounts to 69 bytes for example.

The controller 180 then determines a size of an empty space of the data space [S73]. Since the size of the data space is 80 bytes and the data size of the input-completed message text is 69 bytes, the size of the empty space amounts to 11 bytes.

Subsequently, the controller 180 selects user information most suitable for the size of the empty space from the preset user informations [S74]. In this case, the most suitable user information may include the user information capable of filling the size of the empty space as full as possible. If the most suitable user information is selected in this viewpoint, the controller selects user information, i.e., 'Thomas Lee' (10 bytes) capable of filling the size of the empty space maximally from the user informations exemplarily shown in (8-3) of FIG. 8.

The controller 180 then enables the selected user information to be contained in the data space.

Referring to (9-2) of FIG. 9, the controller 180 sends the message having the selected user information contained therein to a correspondent party [S75]. In sending the message to the correspondent party, the controller 180 can be configured to display an indication 413, which indicates that the user information (i.e., signature) is sent by being contained in the message. Yet, the indication 413, which indicates that the user information is contained in the message, needs not to be always displayed on the display unit 400.

It is able to display the message sent by containing the user information therein, as shown in (9-3) of FIG. 9, on a display unit 500 of a terminal of the correspondent party.

In the above description, explained is that the most suitable user information is selected and then contained in the message when a transmission of the message is commanded after completion of the input of the message text, by which the present embodiment is non-limited. Although not shown in the drawing, after completion of the input of the message text, if a separate command for a selection of the user information is inputted via a manipulation of the user input unit, the most suitable user information is selected and can be then displayed on the message input window of the display unit together with the inputted message text. Subsequently, if the transmission of the message is commanded, it is able to send the message containing the selected user information therein to the correspondent party. In this case, the indication 413 indicating that the user information is contained in the message may not be displayed on the display unit 400.

In the above description, exemplarily explained is that the user information is contained in a tail part of the message text, by which the present embodiment is non-limited. Although not shown in the drawing to visually distinguish the user information from the message text input by the user, it is able to configure the user information to be contained in a fore part of the message text.

Meanwhile, as long as the size of the empty space is allowable, it is able to configure the user information to be contained by leaving a prescribed blank (i.e., a space) from the message text. Alternatively, it is able to configure the user information to be contained in a last end portion of the data space of the message.

Figure 10:
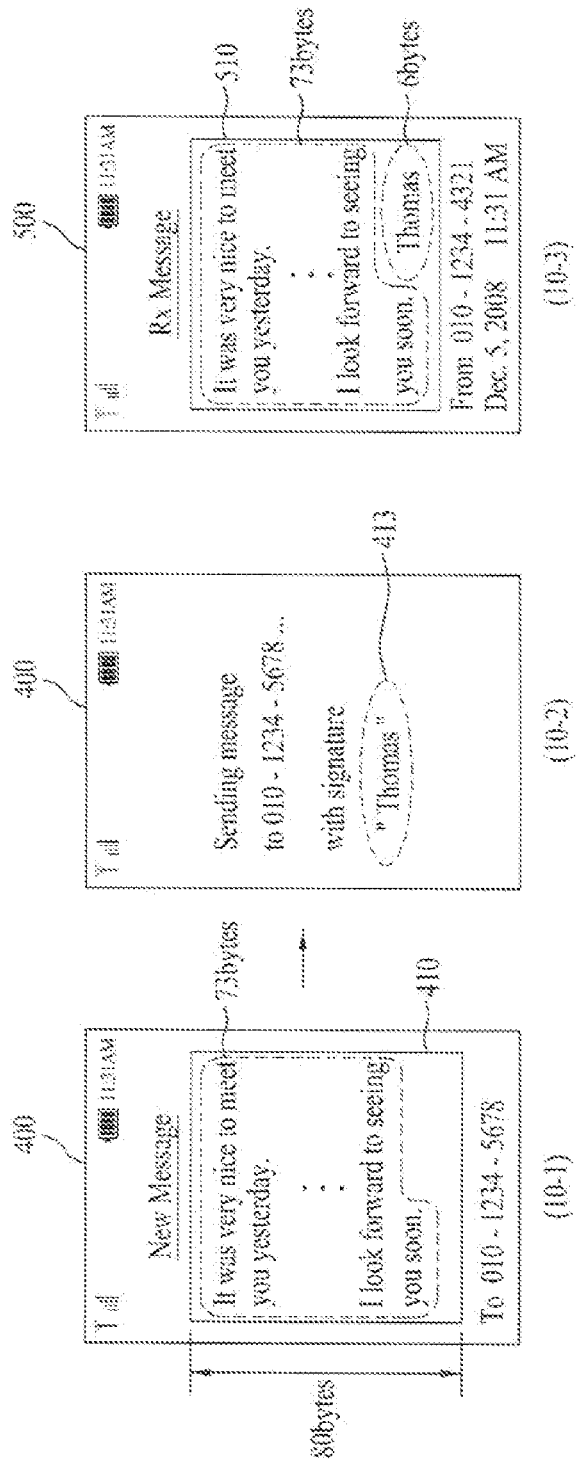

In the following description, explained with reference to FIG. 10 is a case that a size of data of the input-completed message text is greater than 69 bytes.

Referring to (10-1) of FIG. 10, assume that size of data of the input-completed message text is 73 bytes for example.

On the above assumption, the controller 180 determines a size of an empty space in the data space. As the size of the data space is 80 bytes and the data size of the input-completed message text is 73 bytes, the size of the empty space amounts to 7 bytes.

Subsequently, the controller 180 selects user information most suitable for the size of the empty space from the preset user informations. As mentioned in the foregoing description, the most suitable user information can be the user information capable of filing the size of the empty space maximally. If the most suitable user information is selected in this viewpoint, the controller 180 selects the user information (i.e., 'Thomas' (6 bytes)) capable of filling the size (i.e., 7 bytes) of the empty space maximally from the user informations illustrated in (8-3) of FIG. 8.

The controller 180 then enables the selected user information to be contained in the data space.

Referring to (10-2) of FIG. 10, the controller 180 sends the message to a correspondent party. In doing so, as mentioned in the foregoing description, the controller 180 is able to display an indication 413, which indicates that the user information (i.e., a signature) is transmitted by being contained in the message.

Referring to (10-3) of FIG. 10, the message sent by containing the user information therein can be displayed on a display unit 500 of a terminal of the correspondent party.

Figure 11:
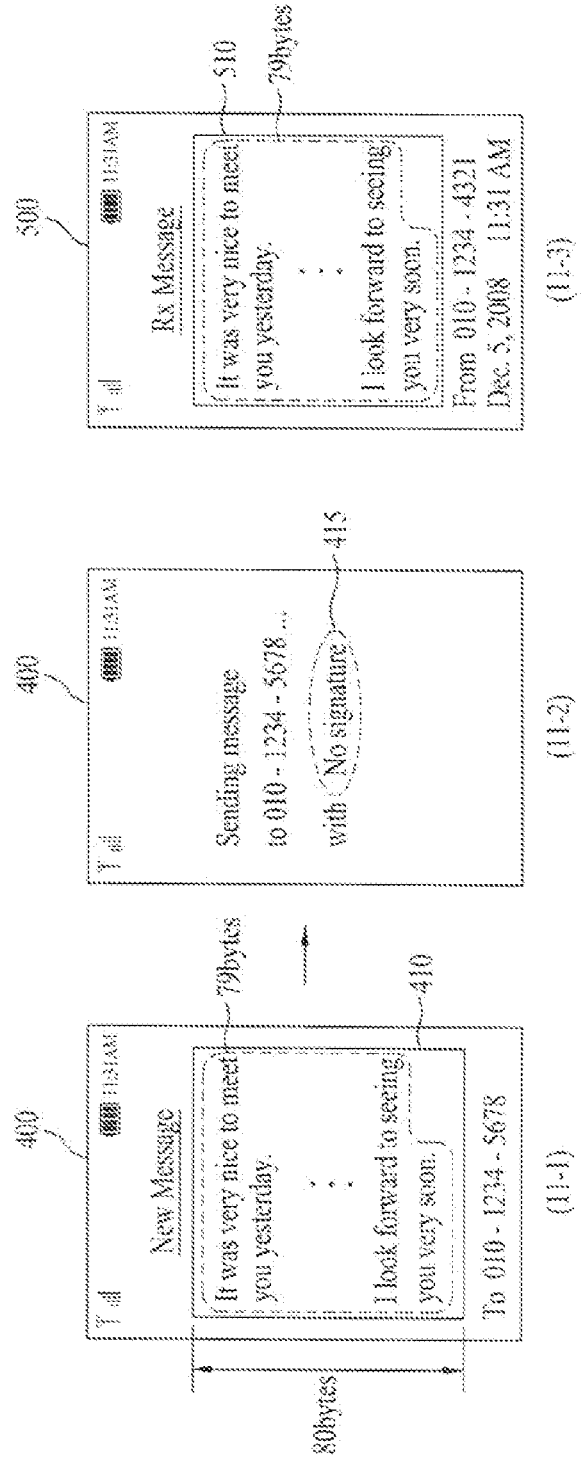

In the following description, explained with reference to FIG. 11 is a case that a size of data of the input-completed message text is greater than 73 bytes.

Referring to (11-1) of FIG. 11, assume that size of data of the input-completed message text is 79 bytes for example.

On the above assumption, the controller 180 determines a size of an empty space in the data space. As the size of the data space is 80 bytes and the data size of the input-completed message text is 79 bytes, the size of the empty space amounts to 1 byte.

Subsequently, the controller 180 selects user information most suitable for the size of the empty space from the preset user informations. As mentioned in the foregoing description, the most suitable user information can be the user information capable of filing the size of the empty space maximally. If the most suitable user information is selected in this viewpoint, the controller 180 recognizes that there is not user information capable of filling the size of the empty space maximally from the user informations illustrated in (8-3) of FIG. 8.

Then, the controller 180 enables none of the user information to be contained in the data space.

Referring to (11-2) of FIG. 11, the controller 180 sends the message to a correspondent party. In doing so, the controller 180 is able to control an indication 415, which indicates that the user information (i.e., a signature) is not contained in the message when the message is sent to the correspondent party, to be displayed on the display unit 400.

Referring to (11-3) of FIG. 11, the message sent by not containing the user information therein can be displayed on a display unit 500 of a terminal of the correspondent party.

In the above description, explained is a case that the mobile terminal 100 automatically selects the most suitable one from the preset user informations available for the empty space of the data space and then enables the selected one to be contained in the message, by which the present invention is non-limited. For instance, it is able to configure one of the preset user informations available for the empty space of the data space to be selected by a terminal user. This is further explained with reference to FIG. 12 as follows.

First of all, a text of a short text message is inputted via the user input unit 140 in the mobile terminal 100.

Figure 12:
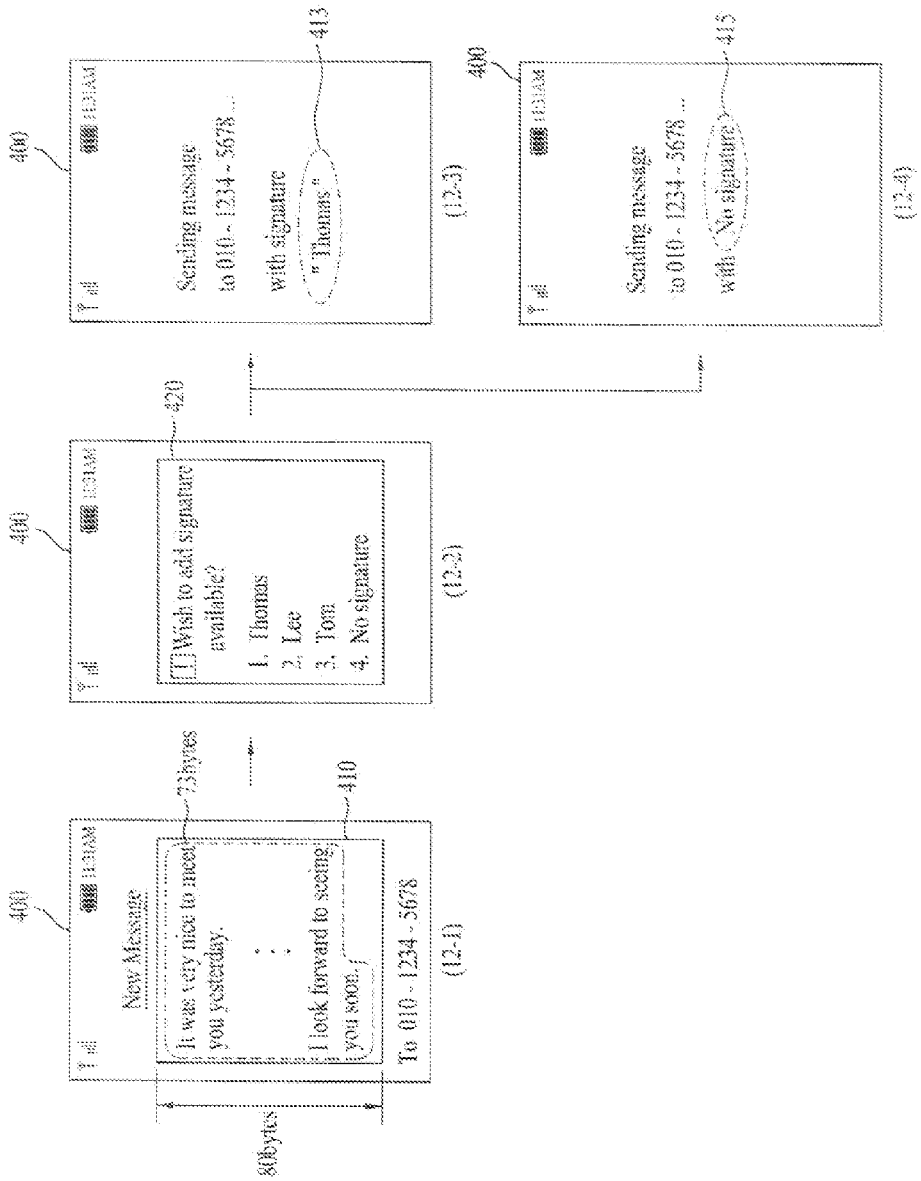

If so, referring to (12-1) of FIG. 12, the inputted message text is displayed on a message input window 410 of the display unit 400.

After the message text input has been completed, a command for sending the message or a separate command for a selection of the user information is inputted via the user input unit 140. In this case, assume that a data size of the input-completed message text is 73 bytes for example.

If so, the controller 180 determines a size of an empty space in the data space. As the size of the data space is 80 bytes and the data size of the input-completed message text is 73 bytes, the size of the empty space amounts to 7 bytes.

Referring to (12-2) of FIG. 12, the controller 180 searches the preset user informations for all user informations fit for the size of the empty space and then displays a list 420 of the searched user informations on the display unit 400. In this case, an item ('4. No signature') for enabling user information not to be contained together with the searched user informations can be included in the list 420.

One user information is selected from the list 420 via the user input unit 140. If the command for sending the message is not inputted yet, the corresponding command is inputted to send the message.

If so, referring to (12-3) of FIG. 12, the controller sends the message containing the selected user information therein to a correspondent party. As mentioned in the foregoing description, an indication 413, which indicates that the user information (i.e., a signature) is contained in the message in sending the message to the correspondent party, can be displayed on the display unit 400.

Meanwhile, an item for enabling the user information not to be selected can be selected from the list 420 via the user input unit 140 as well. If the command for sending the message is not inputted yet, the message sending command is inputted.

If so, referring to (12-4) of FIG. 12, the controller 180 sends the message containing none of the user information therein to the correspondent party. As mentioned in the foregoing description, an indication 415, which indicates that the user information (i.e., a signature) is not contained in the message in sending the message to the correspondent party, can be displayed on the display unit 400.

FIG. 13 is explained as follows.

Referring to (13-1) of FIG. 13, a message input window (or a message input region) 410 and a user information window (a user information region) 425 are separately displayed on the display unit 400.

If a text of a short text message is inputted via the user input unit 140 in the mobile terminal 100, the inputted message text is displayed on the message input window 410.

While the message text is being inputted, the controller 180 keeps determining how large a size of an empty space is in the data space. In (13-1) of FIG. 13, as a size of the data space is 80 bytes and a data size of the inputted text message is 18 bytes, the size of the empty space amounts to 62 bytes.

Subsequently, the controller 180 selects user information most suitable for the size of the empty space from the preset user informations. As mentioned in the foregoing description, the most suitable user information can be the user information capable of filling the size of the empty space maximally. In case that the most suitable user information is selected in this viewpoint, the controller 180 selects the user information (i.e., 'Thomas Lee' (10 bytes)) capable of filling the size of the empty space, i.e., 62 bytes, from the user informations illustrated in (8-3) of FIG. 8.

Subsequently, the controller 180 displays the selected user information on the user information window 425.

Meanwhile, the controller 180 displays a size 427 (corresponding to a size of a message further inputable on the assumption that the selected user information is contained in the message), which results from subtracting the size (i.e., 18 bytes) of the message in the course of being written and the size (i.e., 10 bytes) of the selected user information from the size (80 bytes) of the data space, i.e., 52 bytes on the display unit 400.

Referring to (13-2) of FIG. 13, the message input further proceeds.

Even if the message input further proceeds, the controller 180 keeps determining how large a size of the empty space in the data space. In case shown in (13-2) of FIG. 13, as the size of the data space is 80 bytes and the data size of the inputted message text is 68 bytes, the size of the empty space amounts to 12 bytes.

Subsequently, the controller 180 selects user information most suitable for the size of the empty space from the preset user informations. As mentioned in the foregoing description, the most suitable user information is the user information capable of filling the size of the empty space maximally. In case that the most suitable user information is selected in this viewpoint, the controller 180 still selects the user information (i.e., 'Thomas Lee' (10 bytes)) capable of filling the size of the empty space, i.e., 12 bytes, from the user informations illustrated in (8-3) of FIG. 8.

Subsequently, the controller 180 displays the selected user information on the user information window 425.

Meanwhile, the controller 180 displays a size 427 (corresponding to a size of a message further inputable on the assumption that the selected user information is contained in the message), which results from subtracting the size (i.e., 68 bytes) of the message in the course of being written and the size (i.e., 10 bytes) of the selected user information from the size (80 bytes) of the data space, i.e., 2 bytes on the display unit 400.

Referring to (13-3) of FIG. 13, the message input further proceeds again.

Even if the message input further proceeds again, the controller 180 keeps determining how large a size of the empty space in the data space. In case shown in (13-3) of FIG. 13, as the size of the data space is 80 bytes and the data size of the inputted message text is 73 bytes, the size of the empty space amounts to 7 bytes.

Subsequently, the controller 180 selects user information most suitable for the size of the empty space from the preset user informations. As mentioned in the foregoing description, the most suitable user information is the user information capable of filling the size of the empty space maximally. In case that the most suitable user information is selected in this viewpoint, the controller 180 selects the user information (i.e., 'Thomas' (6 bytes)) capable of filling the size of the empty space, i.e., 7 bytes, from the user informations illustrated in (8-3) of FIG. 8.

Subsequently, the controller 180 displays the selected user information on the user information window 425.

Meanwhile, the controller 180 displays a size 427 (corresponding to a size of a message further inputable on the assumption that the selected user information is contained in the message), which results from subtracting the size (i.e., 73 bytes) of the message in the course of being written and the size (i.e., 6 bytes) of the selected user information from the size (80 bytes) of the data space, i.e., 1 byte on the display unit 400.

Subsequently, a command for sending the message is inputted via the user input unit 140. If so, the controller 180 sends the message, in which the user information finally displayed on the user information window is contained, to a correspondent party.

Referring to (13-4) of FIG. 13, the message containing the user information therein can be displayed on a display unit 500 of a terminal of the correspondent party.

Second Embodiment

A method of controlling a mobile terminal according to a second embodiment of the present invention is explained with reference to FIGS. 14 to 18 as follows.

Figure 14:
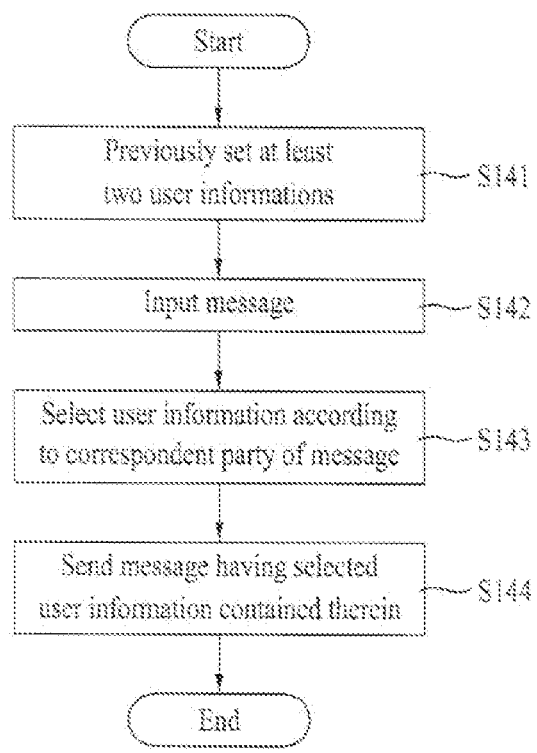
FIG. 14 is a flowchart for a method of controlling a mobile terminal according to a second embodiment of the present invention.
Figure 15:
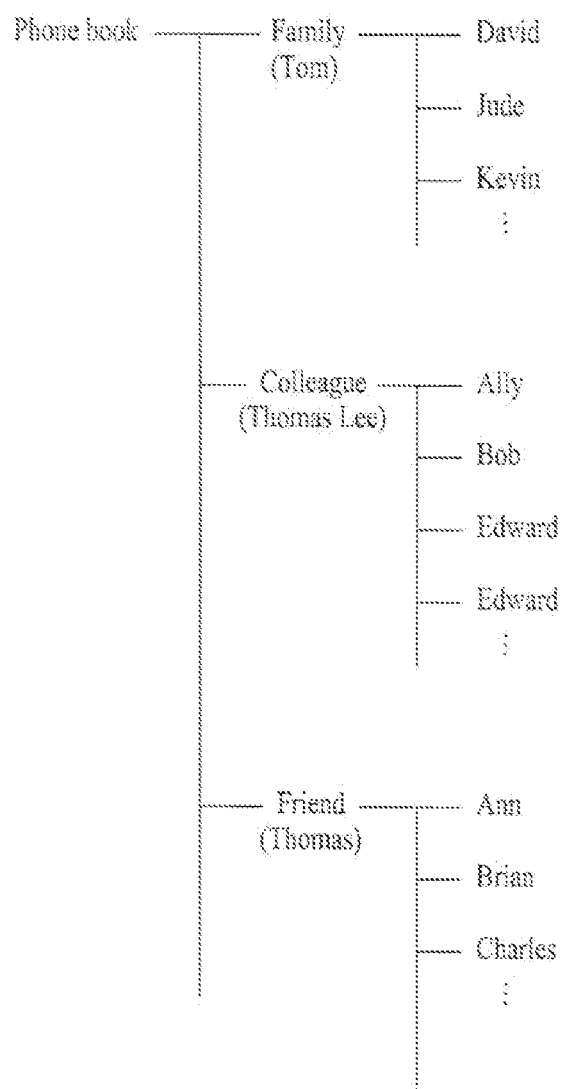
FIG. 15 is an exemplary diagram of a phonebook in which correspondent parties are grouped in a mobile terminal according to the present invention.
Figure 16:
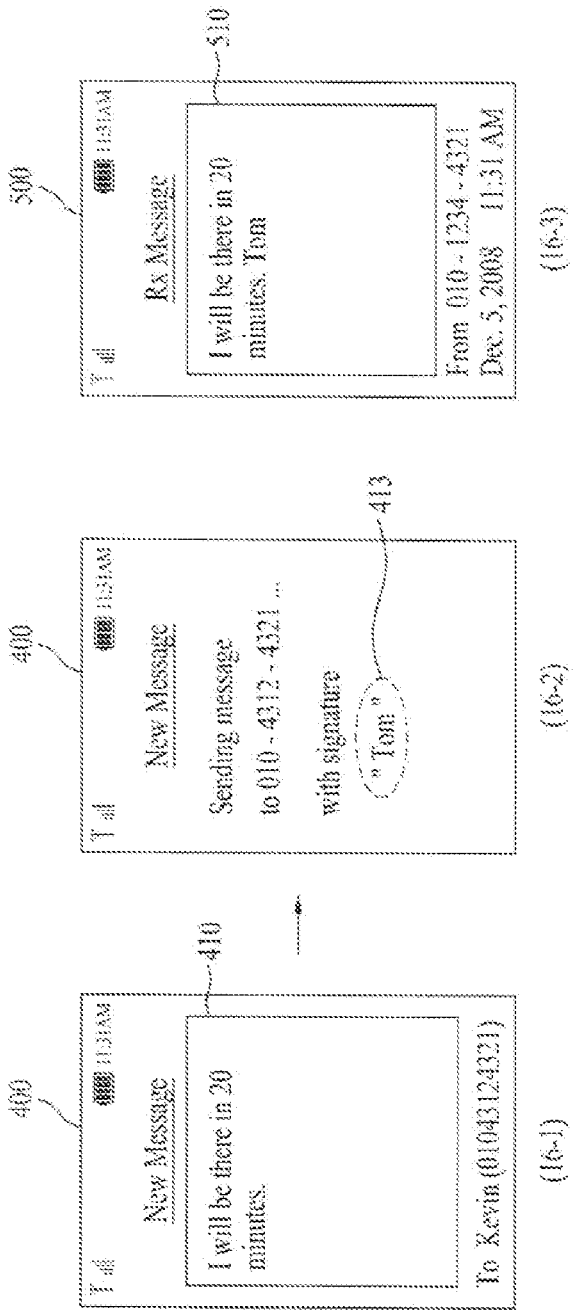
FIGS. 16 to 18 are diagrams of state configurations of a display screen on which a method of controlling a mobile terminal according to a second embodiment of the present invention is implemented.
Figure 17:
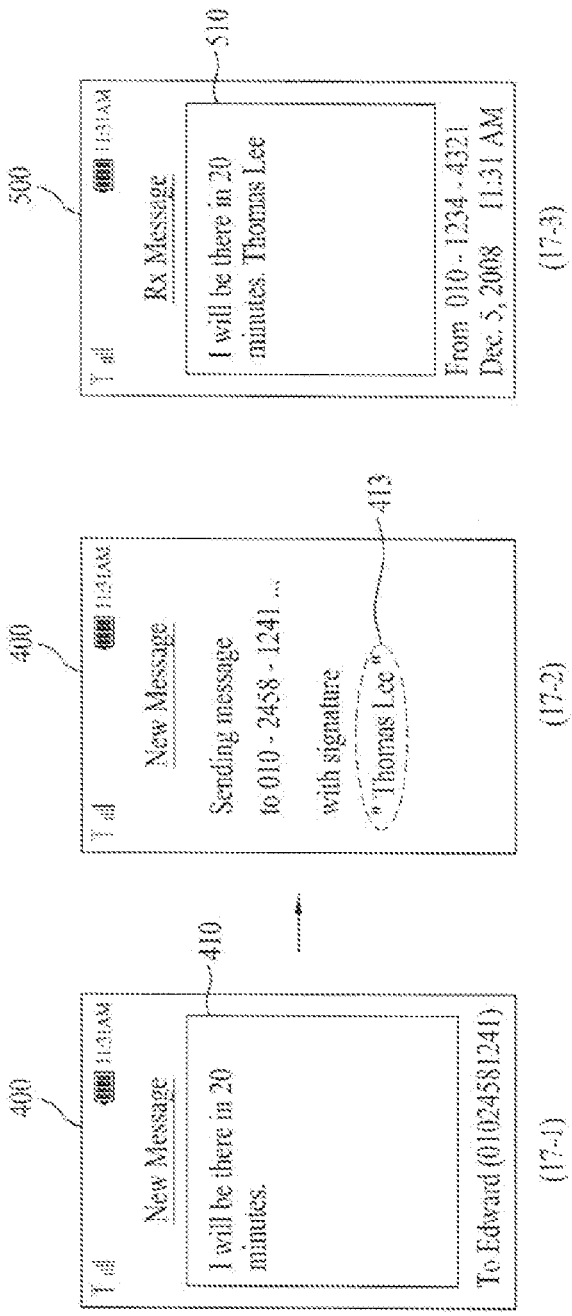
Figure 18:
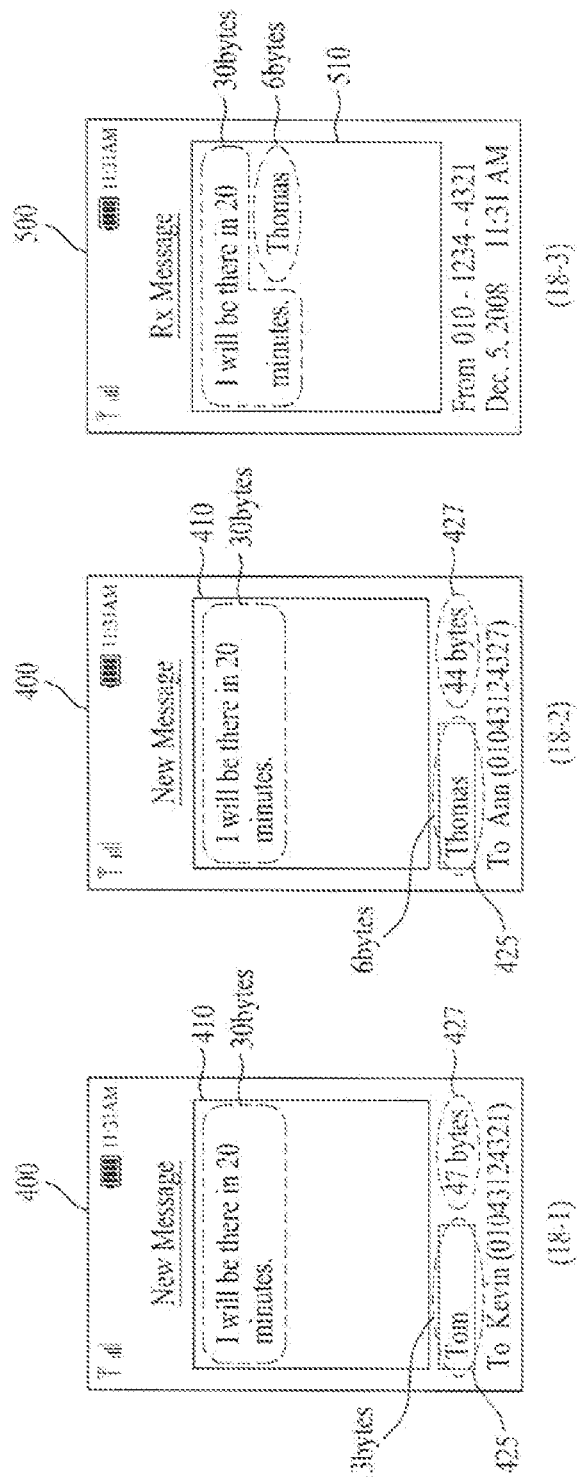

FIG. 14 is a flowchart for a method of controlling a mobile terminal according to a second embodiment of the present invention, FIG. 15 is an exemplary diagram of a phonebook in which correspondent parties are grouped in a mobile terminal according to the present invention, and FIGS. 16 to 18 are diagrams of state configurations of a display screen on which a method of controlling a mobile terminal according to a second embodiment of the present invention is implemented.

In the following description, a phonebook, in which correspondent parties are grouped, in a mobile terminal according to the present invention is explained with reference to FIG. 15.

First of all, as mentioned in the foregoing description, a phonebook can be stored in the memory 160 of the mobile terminal 100. In this case, correspondent parties previously inputted by a terminal user can be stored in the phonebook in a manner of being categorized into groups.

Referring to FIG. 15, correspondent parties are grouped into at least three groups, i.e., a first group ('Family'), a second group ('Colleague') and a third group ('Friend') in the phonebook for example.

It is able to preset the user information per the group.

In FIG. 15, first user information ('Tom') is preset for the first group, second user information ('Thomas Lee') is preset for the second group, and third user information ('Thomas') is preset for the third group, for example.

A procedure for presetting the user information per the group can be performed in a manner of partially modifying the former procedure described with reference FIG. 8. In brief, the procedure for presetting the user information per the group can be performed in a manner of simply adding a step of selecting at least one from the groups of the phonebook for the inputted user information before or after the procedure of inputting prescribed user information in (8-2) of FIG. 8. This is apparent to those skilled in the art and its details will be omitted for clarity of this disclosure.

A process for selecting one of the preset user informations using the above-configured phonebook and enabling the selected user information to be contained in a message is further explained with reference to FIG. 16 and FIG. 17 as follows.

First of all, as mentioned in the foregoing description, the user informations are preset in the mobile terminal 100 [S141].

Subsequently, the mobile terminal enters a message menu. A terminal user then inputs or selects a message correspondent party. It is apparent to those skilled in the art that the entry into the message menu and the input or selection of the message correspondent party can be performed through appropriate manipulations of the user input unit 130 of the mobile terminal 100, of which details shall be omitted for clarity of this disclosure. Assume that the inputted or selected correspondent party is a first correspondent party ('Kevin') belonging to the first group of the phonebook.

A message text of a message is inputted via the user input unit 140 in the mobile terminal 100 [S142]. After the text of the message has been inputted, it is able to configure the first correspondent party is inputted or selected.

If so, referring to (16-1) of FIG. 16, the inputted message text is displayed on a message input window 410 of the display unit 400. And, information on the first correspondent party can be displayed on the display unit 400.

After the message text input has been completed, a command for sending the message or a separate command for inputting (or, inserting) the user information is inputted via the user input unit 140.

If so, the controller 180 selects the first user information preset for the first group, to which the first correspondent party belongs, from the preset user informations [S143]. The controller 180 then enables the selected first user information to be contained in the message text.

If the command for sending the message is not inputted yet, the sending command is inputted.

If so, the controller 180 sends the message having the selected user information contained therein to the first correspondent party [S144]. As mentioned in the foregoing description, referring to (16-2) of FIG. 16, the controller 180 is able to display an indication 413, which indicates that the first user information is contained in the message when the message is sent to the first correspondent party.

The message sent by containing the user information therein, as shown in (16-3) of FIG. 16, can be displayed on a display unit 500 of a terminal of the correspondent party.

In the following description, explained with reference to FIG. 17 is a case that a message correspondent party inputted or selected by a terminal user is a second correspondent party ('Edward') of a second group.

First of all, a text of a message is inputted via the user input unit 140 in the mobile terminal.

If so, referring to (17-1) of FIG. 17, the inputted message text is displayed on a message input window 410 of the display unit 400. And, information on the second correspondent party can be displayed on the display unit 400.

After the message text input has been completed, a command for sending the message or a separate command for inputting (or, inserting) the user information is inputted via the user input unit 140.

If so, the controller 180 selects the second user information preset for the second group, to which the second correspondent party belongs, from the preset user informations. The controller 180 then enables the selected second user information to be contained in the message text.

If the command for sending the message is not inputted yet, the sending command is inputted.

If so, the controller 180 sends the message having the selected user information contained therein to the second correspondent party. As mentioned in the foregoing description, referring to (17-2) of FIG. 17, the controller 180 is able to display an indication 413, which indicates that the second user information is contained in the message when the message is sent to the second correspondent party.

The message sent by containing the user information therein, as shown in (17-3) of FIG. 17, can be displayed on a display unit 500 of a terminal of the correspondent party.

In the following description, FIG. 18 is described.

In FIG. 18, it is assumed that the message has a prestipulated communication protocol to limit a data space to which data (e.g., a message text) can be inputted by a user. In particular, assume that the message has an 80-byte data space to which data can be inputted by a user like a short text message.

Referring to (18-1) of FIG. 18, a message input window (or a message input region) 410 and a user information window (a user information region) 425 are separately displayed on the display unit 400.

A text of a message is inputted after a correspondent of the message has been selected via the user input unit 140 by a user in the mobile terminal 100. Assume that the selected correspondent party is a first correspondent party ('Kevin') of the first group of the phonebook.

If so, the inputted message text is displayed on the message input window 410 and user information (i.e., 'Tom') preset for the group (i.e., the first group) of the phonebook, to which the first correspondent party belongs, is displayed on the user information window 425.

And, the controller 180 displays a size 427 (corresponding to a size of a message further inputable on the assumption that the selected user information is contained in the message), which results from subtracting the size (i.e., 30 bytes) of the message in the course of being written and the size (i.e., 3 bytes) of the selected user information from the size (80 bytes) of the data space, i.e., 47 bytes on the display unit 400.

Meanwhile, assume that the selected correspondent party is a third correspondent party ('Ann') belonging to the third group ('Friend') of the phonebook.

If so, referring to (18-2) of FIG. 18, the inputted message text is displayed on the message input window 410 and user information (i.e., 'Thomas') preset for the group (i.e., the third group) of the phonebook, to which the third correspondent party belongs, is displayed on the user information window 425.

And, the controller 180 displays a size 427 (corresponding to a size of a message further inputable on the assumption that the selected user information is contained in the message), which results from subtracting the size (i.e., 30 bytes) of the message in the course of being written and the size (i.e., 6 bytes) of the selected user information from the size (80 bytes) of the data space on the display unit 400.

Subsequently, a command for sending the message is inputted via the user input unit 140. If so, the controller 180 sends the message containing the user information displayed on the user information window to the correspondent party.

The message sent by containing the user information therein, as shown in (18-3) of FIG. 18, can be displayed on a display unit 500 of a terminal of the correspondent party.

Third Embodiment

A method of controlling a mobile terminal according to a third embodiment of the present invention is explained with reference to FIGS. 19 to 21 as follows.

Figure 19:
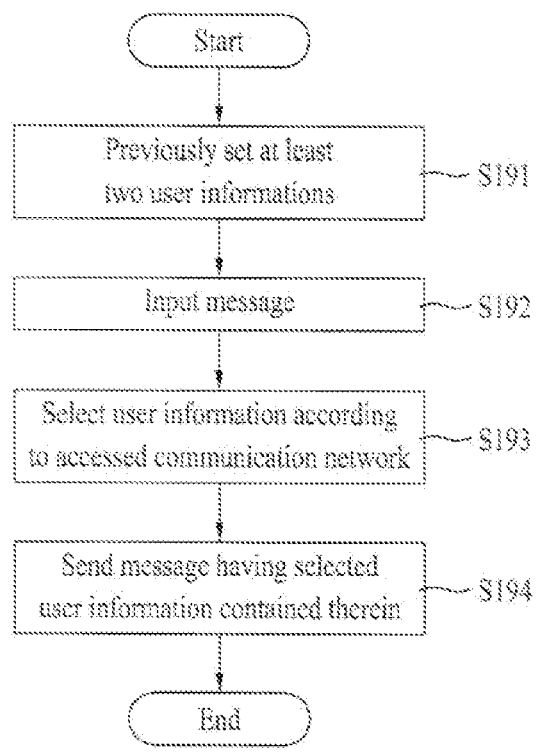
FIG. 19 is a flowchart for a method of controlling a mobile terminal according to a third embodiment of the present invention.
Figure 20:
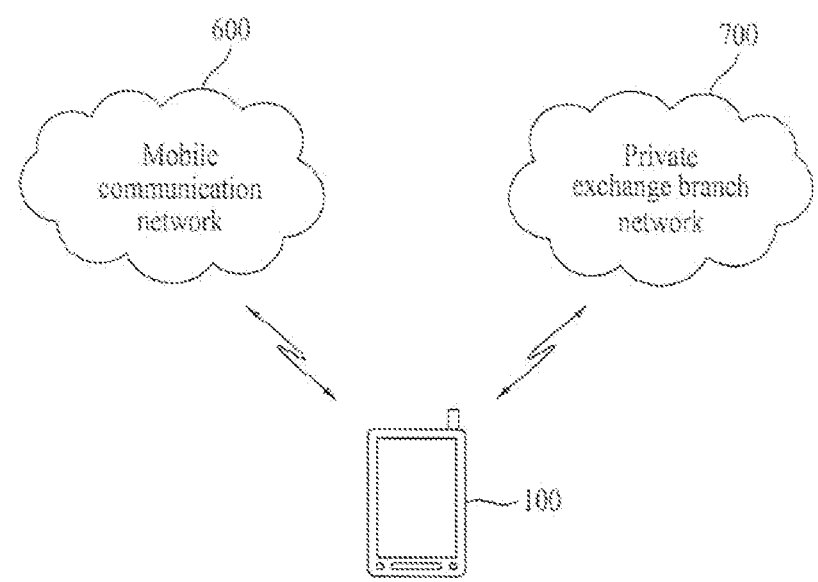
FIG. 20 is a diagram of a network to which a mobile terminal is accessible by a method of controlling a mobile terminal according to a third embodiment of the present invention.
Figure 21:
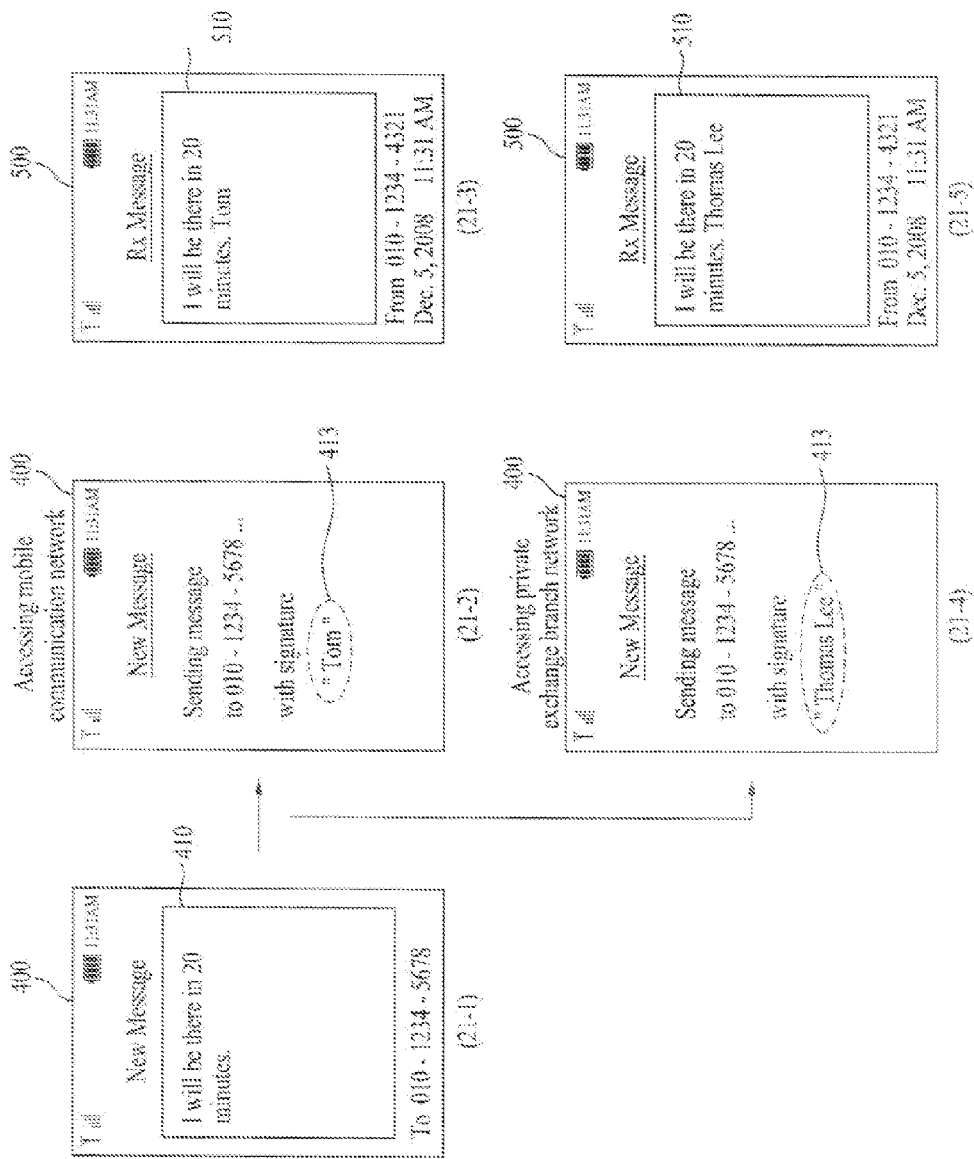
FIG. 21 is a e diagram of state configurations of a display screen on which a method of controlling a mobile terminal according to a third embodiment of the present invention is implemented.

FIG. 19 is a flowchart for a method of controlling a mobile terminal according to a third embodiment of the present invention, FIG. 20 is a diagram of a network to which a mobile terminal is accessible by a method of controlling a mobile terminal according to a third embodiment of the present invention, and FIG. 21 is a e diagram of state configurations of a display screen on which a method of controlling a mobile terminal according to a third embodiment of the present invention is implemented.

Referring to FIG. 20, the mobile terminal 100 is directly accessible to a mobile communication network 600 or is indirectly accessible to the mobile communication network 600 via a wireless private branch exchange (WPBX) network 700. Therefore, it is able to configure user information, which is inserted in case of a message transmission, vary according to a communication network the mobile terminal 100 accesses. The mobile communication network and the wireless private branch exchange network are examples for the communication networks only. And, it is understood that other communication networks are available for the present embodiment.

The above description is further explained in detail as follows.

First of all, as mentioned in the foregoing description, the user informations are preset in the mobile terminal 100 [S191].

The mobile terminal 100 enters a message menu. Subsequently, a terminal user inputs or selects a message correspondent party. Since it is apparent to those skilled in the art that the entry into the message menu or the input or selection of the message correspondent party can be performed by an appropriate manipulation of the user input unit 130 of the mobile terminal 100, corresponding details shall be omitted from the following description for clarity of this disclosure.

Subsequently, a text of a message is inputted via the user input unit 140 in the mobile terminal 100 [S192]. Alternatively, after the text of the message has been inputted, it is able to configure the correspondent party to be inputted or selected.

If so, referring to (21-1) of FIG. 21, the inputted message text is displayed on a message input window 410 of the display unit 400.

After the message text input has been completed, a command for sending the message or a separate command for inputting (or, selecting) the user information is inputted via the user input unit 140.

The controller 180 then determines what kind of a network is used by the wireless communication unit 110 to access for the message.

If the accessed network is a first communication network (e.g., a mobile communication network), the controller 180 selects first user information ('Tom') for the first communication network from the preset user informations and then enables the first user information to be contained in the message text [S193].

If the command for sending the message is not inputted yet, the sending command is inputted.

If so, the controller 180 sends the message having the selected user information contained therein to the first correspondent party [S194]. As mentioned in the foregoing description, referring to (21-2) of FIG. 21, the controller 180 is able to control an indication 413, which indicates that the first user information is contained in the message when the message is sent to the correspondent party, to be displayed on the display unit 400.

The message sent by containing the user information therein, as shown in (21-3) of FIG. 21, can be displayed on a display unit 400.

Meanwhile, if the accessed network is a second communication network (e.g., a wireless private branch exchange) network, the controller 180 selects second user information ('Thomas Lee') for the second communication network from the preset user informations and then enables the second user information to be contained in the message text.

If the command for sending the message is not inputted yet, the sending command is inputted.

If so, the controller 180 sends the message having the selected user information contained therein to the first correspondent party. As mentioned in the foregoing description, referring to (21-4) of FIG. 21, the controller 180 is able to control an indication 413, which indicates that the second user information is contained in the message when the message is sent to the correspondent party, to be displayed on the display unit 400.

The message sent by containing the user information therein, as shown in (21-5) of FIG. 21, can be displayed on a display unit 500 of a terminal of the correspondent party.

Fourth Embodiment

A method of controlling a mobile terminal according to a fourth embodiment of the present invention is explained with reference to FIGS. 22 to 25 as follows.

Figure 22:
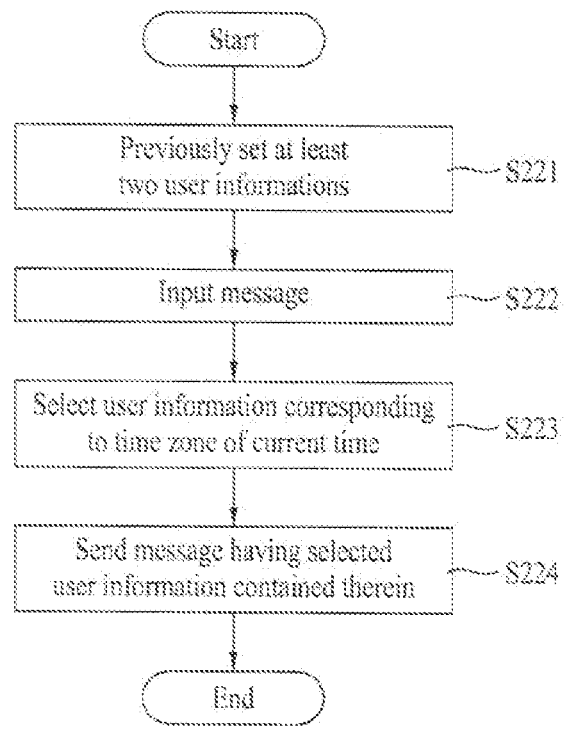
FIG. 22 is a flowchart for a method of controlling a mobile terminal according to a fourth embodiment of the present invention.
Figure 23:
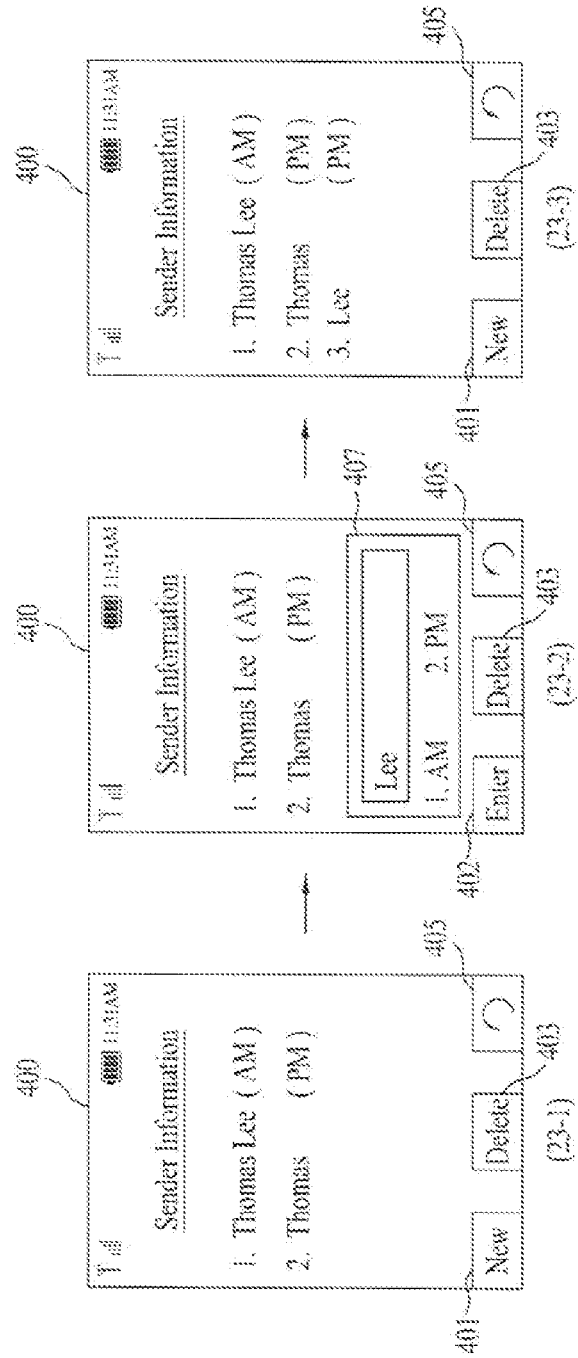
Figure 24:
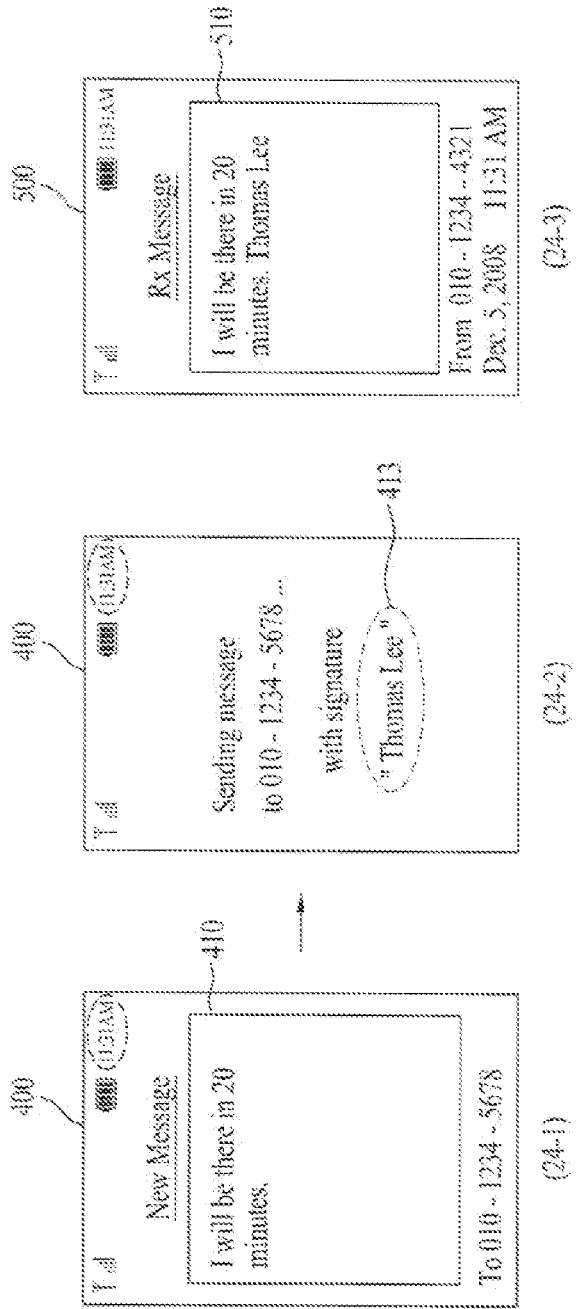

FIG. 22 is a flowchart for a method of controlling a mobile terminal according to a fourth embodiment of the present invention, and FIGS. 23 to 25 are diagrams of state configurations of a display screen on which a method of controlling a mobile terminal according to a fourth embodiment of the present invention is implemented.

First of all, user information containable in a message in sending the message can be preset per time zone in the mobile terminal 100 [S221].

How to set the user information per time zone in the mobile terminal 100 is explained with reference to FIG. 23 as follows. Specifically, the following description relates to a case that user information is set for an a.m. time zone and a p.m. time zone, by which the present embodiment is non-limited. And, it is understood that user information can be set for another time zone as well. In particular, user information can be set per data-time zone (e.g., Monday-to-Friday time zone & Saturday-to-Sunday time zone).

First of all, the mobile terminal 100 enters a menu for setting the user information. It is apparent to those skilled in the art that this entry into the user information setting menu can be performed by an appropriate manipulation of the user input unit 130 of the mobile terminal 100. Details of the entry are omitted from the following description for clarity of this disclosure.

Once the user information setting menu is entered, referring to (23-1) of FIG. 23, preset user information ("Thomas Lee", "Thomas"), which has been set previously, can be displayed on the display unit 400. The preset user information is displayable with a corresponding time zone. Optionally, the user information can be displayed only.

Subsequently, a command for initiating a setting of new user information is inputted via the user input unit 180 in the mobile terminal 100. In (23-1) of FIG. 23, exemplarily shown is that the command for initiating the setting of the new user information is inputted in a manner of displaying an icon 401 for a new user information setting initiation on the display unit 400 and then selecting the setting initiation icon 401 to input the command for the new information setting initiation.

After the command for the new user information setting has been inputted, a terminal user is able to input specific information via the user input unit 140. In doing so, referring to (23-2) of FIG. 23, the inputted user information can be displayed via a user information input window 407 of the display unit 400. And, the time zone of the inputted user information can be selected from the user information input window 407 via the user input unit 140.

After the user information has inputted and the corresponding time zone has been determined, a command for completing the setting of the new user information is inputted via the user input unit 180 in the mobile terminal 100. In (23-2) of FIG. 23, exemplarily shown is that the command for completing the new user information setting is inputted in a manner of displaying an icon 402 for new user information setting completion on the display unit 400 and then selecting the setting completion icon 402.

If so, the presetting of the inputted user information is completed. Referring to (23-3) of FIG. 23, the presetting-completed user information ("Lee") can be displayed on the display unit 400.

In the following description, a method of utilizing the preset user information in sending the message on an a.m. time zone is explained with reference to FIG. 24.

First of all, the mobile terminal enters a message menu. A terminal user then inputs or selects a message correspondent party. It is apparent to those skilled in the art that the entry into the message menu and the input or selection of the message correspondent party can be performed through appropriate manipulations of the user input unit 130 of the mobile terminal 100, of which details shall be omitted for clarity of this disclosure.

Subsequently, a message text of a message is inputted via the user input unit 140 in the mobile terminal 100 [S222]. Alternatively, after the text of the message has been inputted, it is able to configure the correspondent party is inputted or selected.

If so, referring to (24-1) of FIG. 24, the inputted message text is displayed on a message input window 410 of the display unit 400. And, information on the correspondent party can be displayed on the display unit 400.

After the message text input has been completed, a command for sending the message or a separate command for inputting (or, inserting) the user information is inputted via the user input unit 140.

If so, the controller 180 selects the first user information ('Thomas Lee') preset for the a.m. time zone from the preset user informations [S223]. The controller 180 then enables the selected first user information to be contained in the message text.

If the command for sending the message is not inputted yet, the sending command is inputted.

If so, the controller 180 sends the message having the selected user information contained therein to the correspondent party [S224]. As mentioned in the foregoing description, referring to (24-2) of FIG. 24, the controller 180 is able to display an indication 413, which indicates that the first user information is contained in the message when the message is sent to the correspondent party.

The message sent by containing the user information therein, as shown in (24-3) of FIG. 24, can be displayed on a display unit 500 of a terminal of the correspondent party.

In the following description, explained with reference to FIG. 25 is a method of utilizing the preset user information in sending a message on a p.m. time zone.

First of all, the mobile terminal enters a message menu. A terminal user then inputs or selects a message correspondent party.

Subsequently, a message text of a message is inputted via the user input unit 140 in the mobile terminal 100. Alternatively, after the text of the message has been inputted, it is able to configure the correspondent party is inputted or selected.

If so, referring to (25-1) of FIG. 25, the inputted message text is displayed on a message input window 410 of the display unit 400. And, information on the correspondent party can be displayed on the display unit 400.

After the message text input has been completed, a command for sending the message or a separate command for inputting (or, inserting) the user information is inputted via the user input unit 140.

If so, the controller 180 searches the preset user informations for all user informations preset for a p.m. time zone and then displays a list 420 of the searched user informations on the display unit 400.

Second user information ('Thomas') is selected from the list 420 via the user input unit [S223]. The controller 180 then enables the selected second user information to be contained in the message text.

If the command for sending the message is not inputted yet, the sending command is inputted.

If so, the controller 180 sends the message having the selected user information contained therein to the correspondent party [S224]. As mentioned in the foregoing description, referring to (25-3) of FIG. 25, the controller 180 is able to control an indication 413, which indicates that the second user information is contained in the message when the message is sent to the correspondent party, to be displayed on the display unit 400.

The message sent by containing the second user information therein, as shown in (25-4) of FIG. 25, can be displayed on a display unit 500 of a terminal of the correspondent party.

Fifth Embodiment

A method of controlling a mobile terminal according to a fifth embodiment of the present invention is explained with reference to FIGS. 26 to 29 as follows.

Figure 26:
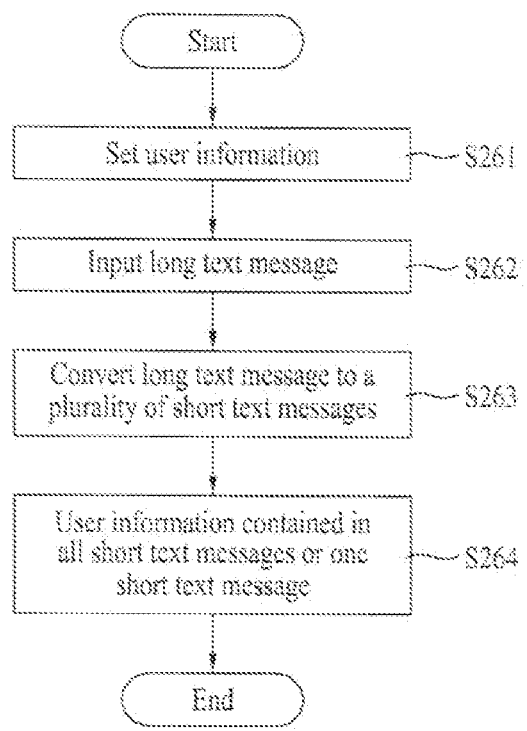
FIG. 26 is a flowchart for a method of controlling a mobile terminal according to a fifth embodiment of the present invention.
Figure 27:
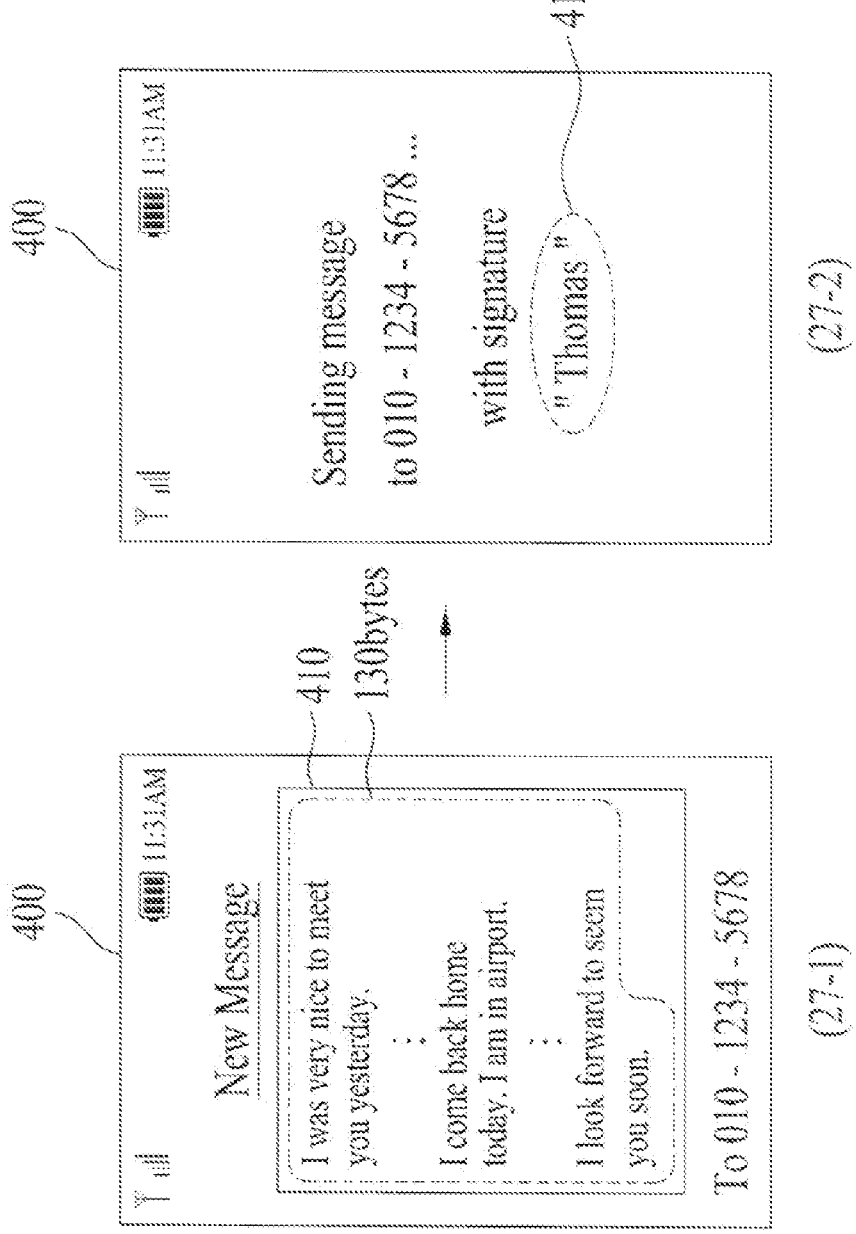
FIGS. 27 to 29 are diagrams of state configurations of a display screen on which a method of controlling a mobile terminal according to a fifth embodiment of the present invention is implemented.
Figure 28:
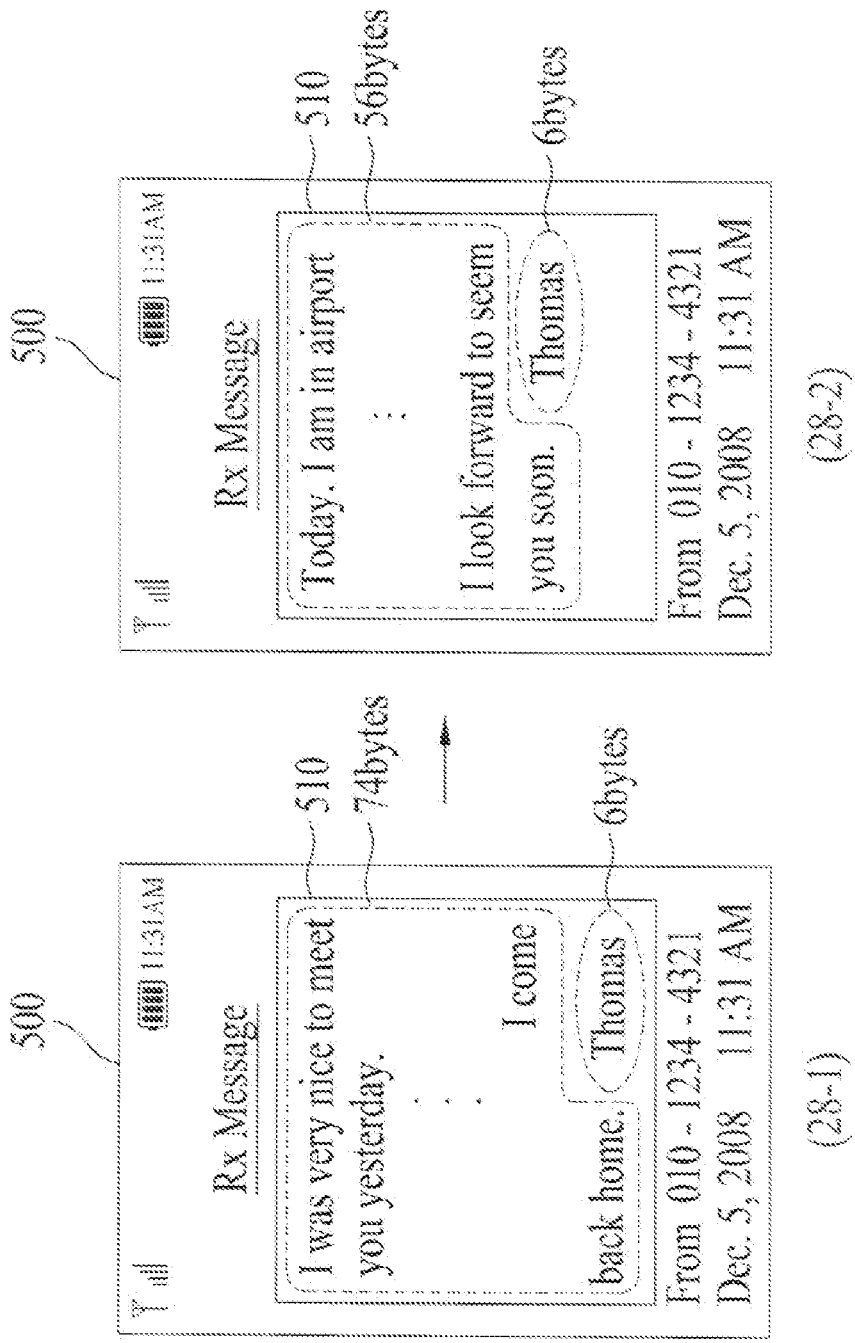
Figure 29:
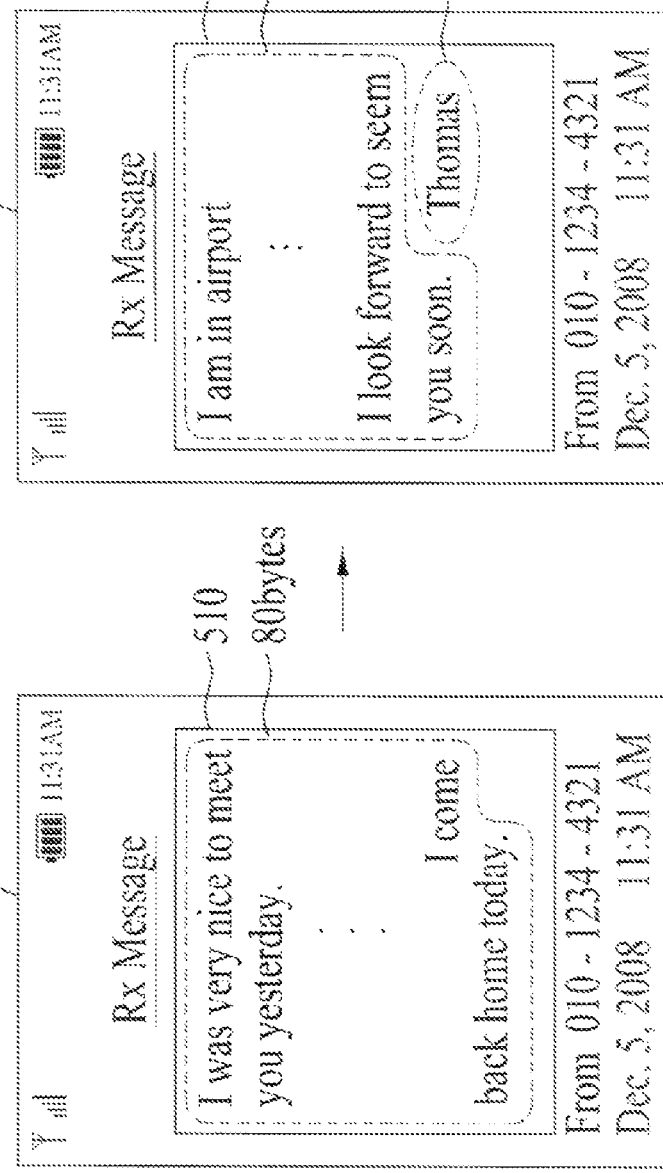

FIG. 26 is a flowchart for a method of controlling a mobile terminal according to a fifth embodiment of the present invention, and FIGS. 27 to 29 are diagrams of state configurations of a display screen on which a method of controlling a mobile terminal according to a fifth embodiment of the present invention is implemented.

Such a message as a short text message has a communication protocol previously stipulated to limit a data space to which data (e.g., a message text) is inputted by a user to be sent. Recently, a long text message (long message service, LMS) has been introduced. According to the long message service, a message text can be written over the data space. And, the written message text can be sent to a correspondent party in a manner of being divided into at least two short text messages by considering the limited data space.

In the following description, how to enable the user information to be contained in the long text message (LMS) in the course of writing the long text message is explained. And, assume that a maximum data space, to which data can be inputted by a user, is 80 bytes in the short text message to be sent.

First of all, as mentioned in the foregoing description, user informations are previously set in the mobile terminal 100 [S261].

Subsequently, the mobile terminal enters a message menu. A terminal user then inputs or selects a message correspondent party.

A message text of a message is then inputted via the user input unit 140 in the mobile terminal 100 [S262]. Alternatively, after the text of the message has been inputted, it is able to configure the correspondent party is inputted or selected.

If so, referring to (27-1) of FIG. 27, the inputted message text is displayed on a message input window 410 of the display unit 400. In this case, the inputted message text amounts to 130 bytes greater than the maximum data space of 80 bytes.

After the message text input has been completed, a command for sending the message or a separate command for inputting (or, inserting) the user information is inputted via the user input unit 140.

If so, the controller 180 enables the preset user information (e.g., 'Thomas') to be contained in the message text.

If the command for sending the message is not inputted yet, the sending command is inputted.

If so, the controller 180 sends the message having the user information contained therein to the correspondent party. As mentioned in the foregoing description, referring to (27-2) of FIG. 27, the controller 180 is able to display an indication 413, which indicates that the user information is contained in the message when the message is sent to the correspondent party.

In sending the message, the controller 180 divides the message into two short text messages. In this case, the controller 180 is able to control the user information to be included in both of the short text messages or one of the short text messages only.

In particular, referring to (28-1) and (28-2) of FIG. 28, when the controller 180 divides the long text message into the two short text messages [S263], the controller 180 is able to control the user information to be included in both of the two short text messages [S264].

Alternatively, referring to (29-1) and (29-2) of FIG. 29, when the controller 180 divides the long text message into the two short text messages [S263], the controller 180 is able to control the user information to be included in one of the two short text messages only [S264]. In (29-1) and (29-2) of FIG. 29, exemplarily shown is that the user information is contained in a second one of the two short text messages, by which the present embodiment is non-limited. Alternatively, it is able to configure the user information to be contained in a first one of the two short text messages, Sixth Embodiment A method of controlling a mobile terminal according to a sixth embodiment of the present invention is explained with reference to FIGS. 30 to 32 as follows.

Figure 30:
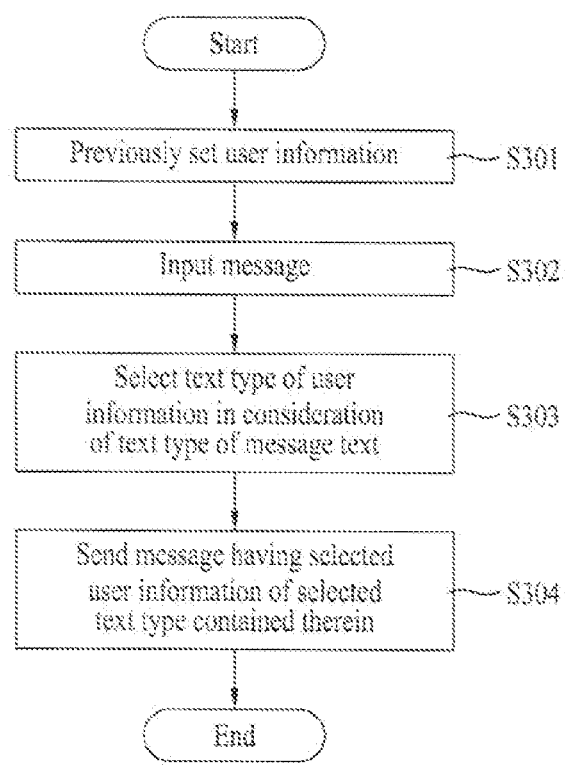
FIG. 30 is a flowchart for a method of controlling a mobile terminal according to a sixth embodiment of the present invention.
Figure 31:
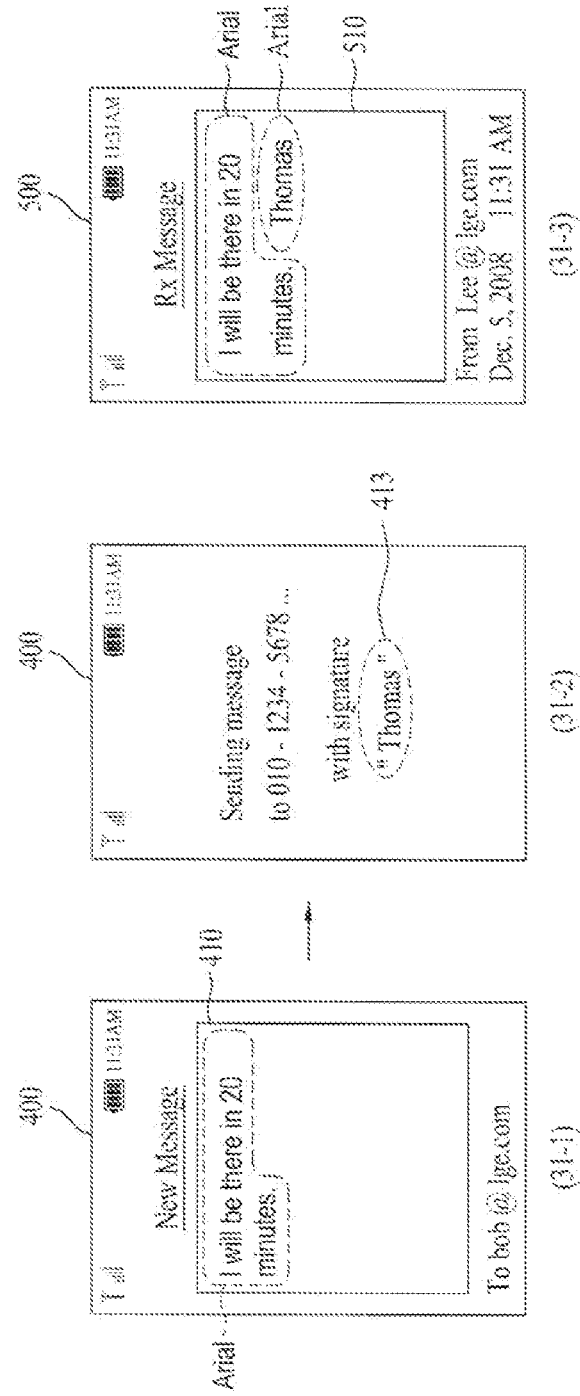
FIGS. 31 and FIG. 32 are diagrams of state configurations of a display screen on which a method of controlling a mobile terminal according to a sixth embodiment of the present invention is implemented.
Figure 32:
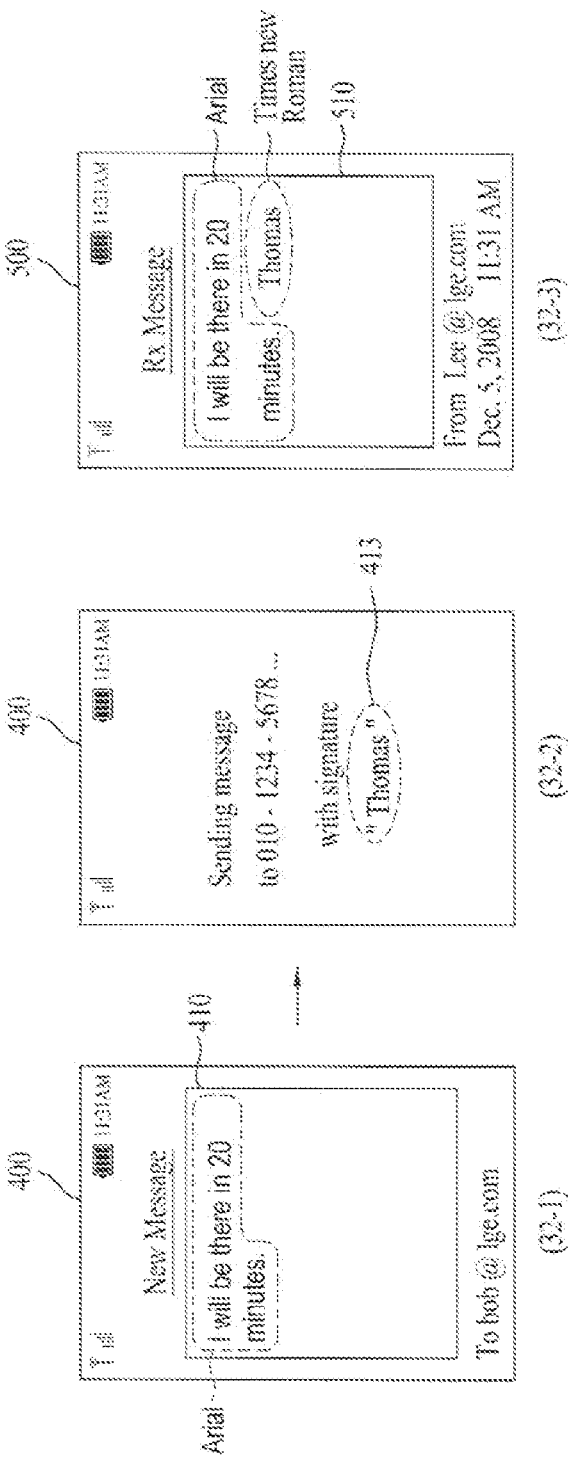

FIG. 30 is a flowchart for a method of controlling a mobile terminal according to a sixth embodiment of the present invention, and FIG. 31 and FIG. 32 are diagrams of state configurations of a display screen on which a method of controlling a mobile terminal according to a sixth embodiment of the present invention is implemented.

In the present embodiment, assume that a text type of a text of a message can be selected by a user. For example, a text of an e-mail message or a multimedia message can be selected by a user. In this case, the text type can include at least one of a text font, a text color and a text size and the like. For clarity of the drawings, assume that the text type is the text font for clarity.

First of all, as mentioned in the foregoing description, the user informations are previously set in the mobile terminal 100 [S301].

Subsequently, the mobile terminal 100 enters a message menu. A terminal user then inputs or selects a message correspondent party.

A message text of a message is then inputted via the user input unit 140 in the mobile terminal 100 [S302]. Alternatively, after the text of the message has been inputted, it is able to configure the correspondent party is inputted or selected.

When the message text is inputted, a text type of the message text can be selected through an appropriate manipulation of the user input unit 130. In this case, the selected text font is a first text font (e.g., 'Arial').

If so, referring to (31-1) of FIG. 31, the inputted message text is displayed as the first text font on a message input window 410 of the display unit 400.

After the message text input has been completed, a command for sending the message or a separate command for inputting (or, inserting) the user information is inputted via the user input unit 140.

If so, the controller 180 enables the preset user information (e.g., 'Thomas') to be contained in the message text. In this case, the controller 180 selects the first text font equal to the text font of the message text as a text font of the user information [S303].

If the command for sending the message is not inputted yet, the sending command is inputted.

If so, the controller 180 sends the message having the user information contained therein to the correspondent party [S304]. As mentioned in the foregoing description, referring to (31-2) of FIG. 31, the controller 180 is able to display an indication 413, which indicates that the user information is contained in the message when the message is sent to the correspondent party.

The message sent by having the user information contained therein, as shown in (31-3) of FIG. 31, can be displayed as the first text font on a display unit 500 of a terminal of the correspondent party in a manner that the user information and the message text are displayed as the same font.

Meanwhile, it is able to write the message text of at least two text types by being mixed together. In this case, the controller 180 is able to control the text font of the user information to be equal to the text font occupying most parts of the message text.

Alternatively, it is able to select the text font of the message text to be different from that of the user information. This is further explained with reference to FIG. 32 as follows.

Referring to (32-1) of FIG. 32, the inputted message text is displayed as a first text font ('Arial') on a message input window 410 of the display unit 400.

After the message text input has been completed, a command for sending the message or a separate command for inputting (or, inserting) the user information is inputted via the user input unit 140.

If so, the controller 180 enables the preset user information (e.g., 'Thomas') to be contained in the message text. In this case, the controller 180 selects a second text font (e.g., 'Times New Roman') different from the text font of the message text as a text font of the user information [S303]. In particular, the message text and the user information are made to be visually discriminated from each other well.

If the command for sending the message is not inputted yet, the sending command is inputted.

If so, the controller 180 sends the message having the user information contained therein to the correspondent party [S304]. As mentioned in the foregoing description, referring to (32-2) of FIG. 32, the controller 180 is able to display an indication 413, which indicates that the user information is contained in the message when the message is sent to the correspondent party.

The message sent by having the user information contained therein, as shown in (32-3) of FIG. 32, can be displayed on a display unit 500 of a terminal of the correspondent party in a manner that the user information and the message text are displayed as the first text and the second text font, respectively.

Meanwhile, it is able to write the message text of at least two text types by being mixed together. In this case, the controller 180 is able to control the text font of the user information to be different from to the text font occupying most parts of the message text. Alternatively, the controller 180 is able to control the user information to be different from the at least two text fonts.

Seventh Embodiment

A method of controlling a mobile terminal according to a seventh embodiment of the present invention is explained with reference to FIG. 33 and FIG. 34 as follows.

Figure 33:
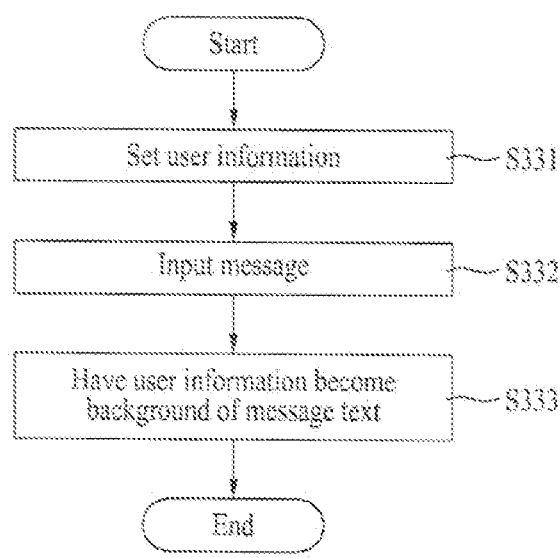
FIG. 33 is a flowchart for a method of controlling a mobile terminal according to a seventh embodiment of the present invention.
Figure 34:
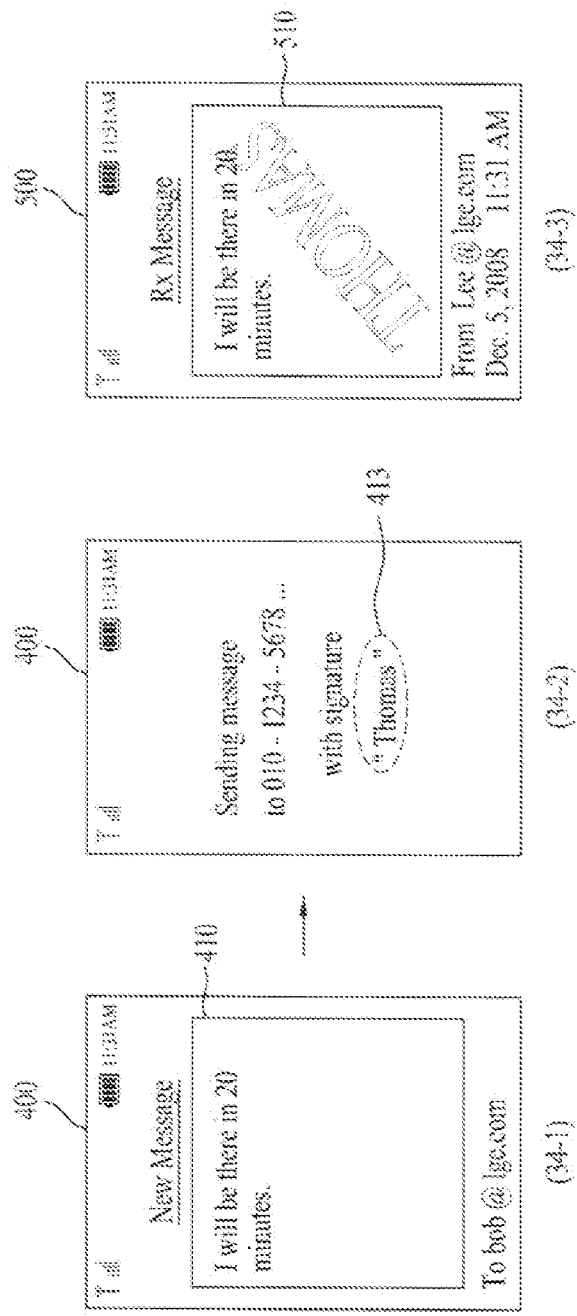
FIG. 34 is a diagram of state configurations of a display screen on which a method of controlling a mobile terminal according to a seventh embodiment of the present invention is implemented.

FIG. 33 is a flowchart for a method of controlling a mobile terminal according to a seventh embodiment of the present invention, and FIG. 34 is a diagram of state configurations of a display screen on which a method of controlling a mobile terminal according to a seventh embodiment of the present invention is implemented.

In the present embodiment, assume that a background of a text of a message such as an e-mail message, a multimedia message and the like can be selected.

First of all, as mentioned in the foregoing description, the user informations are previously set in the mobile terminal 100 [S331].

Subsequently, the mobile terminal 100 enters a message menu. A terminal user then inputs or selects a message correspondent party.

A message text of a message is then inputted via the user input unit 140 in the mobile terminal 100 [S332]. Alternatively, after the text of the message has been inputted, it is able to configure the correspondent party is inputted or selected.

If so, referring to (34-1) of FIG. 34, the inputted message text is displayed on a message input window 410 of the display unit 400.

After the message text input has been completed, a command for sending the message or a separate command for inputting (or, inserting) the user information is inputted via the user input unit 140.

If so, the controller 180 enables the preset user information (e.g., 'Thomas') to become a background of the message text [S333]. In this case, the controller 180 is able to convert the user information to an image to become the background of the message text.

If the command for sending the message is not inputted yet, the sending command is inputted.

If so, the controller 180 sends the message, in which the user information becomes the background of the message text, to the correspondent party. As mentioned in the foregoing description, referring to (34-2) of FIG. 34, the controller 180 is able to control an indication 413, which indicates that the user information is contained in the message when the message is sent to the correspondent party, to be displayed on the display unit 400.

The message sent by having the user information becomes the background of the message text, as shown in (34-3) of FIG. 34, can be displayed on a display unit 500 of a terminal of the correspondent party. In this case, the user information may look like a watermark of the message.

Eighth Embodiment

A method of controlling a mobile terminal according to an eighth embodiment of the present invention is explained with reference to FIG. 35 and FIG. 36 as follows.

Figure 35:
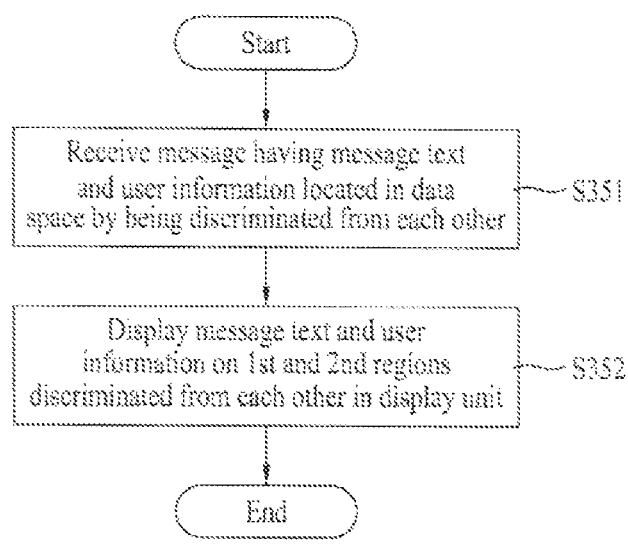
FIG. 35 is a flowchart for a method of controlling a mobile terminal according to an eighth embodiment of the present invention.

FIG. 35 is a flowchart for a method of controlling a mobile terminal according to an eighth embodiment of the present invention, and FIG. 36 is a diagram of state configurations of a display screen on which a method of controlling a mobile terminal according to an eighth embodiment of the present invention is implemented.

In the present embodiment, assume that a message is configured to enable a message text and user information to be loaded on separate data fields of the message. The data field for the message text and the data field for the user information can be located in the data space together. Alternatively, the data filed for the message text can be located in the data space only.

First of all, as mentioned in the foregoing description, the user informations are previously set in the mobile terminal 100.

Subsequently, the mobile terminal 100 enters a message menu. A terminal user then inputs or selects a message correspondent party.

It is apparent to those skilled in the art that the entry into the message menu and the input or selection of the message correspondent party can be performed through appropriate manipulations of the user input unit 130 of the mobile terminal 100, of which details shall be omitted for clarity of this disclosure.

A message text of a message is then inputted via the user input unit 140 in the mobile terminal 100. Alternatively, after the text of the message has been inputted, it is able to configure the correspondent party is inputted or selected.

Referring to (36-1) of FIG. 36, a message input window (or, a message input region) 410 and a user information window (or, a user information region) 425 can be separately displayed on the display unit 400. Therefore, the inputted message text is displayed on the message input window 410 of the display unit 400. And, the user information preset for the message is displayed on the user information window 425.

Subsequently, a command for sending the message is inputted.

If so, the controller 180 sends the message, in which the message text and the user information are loaded on the different data fields, respectively, to the correspondent party.

The message, which is sent in a manner that the message text and the user information are loaded on the different data fields, respectively, as shown in (36-2) of FIG. 36, is received by a terminal of the correspondent party [S351].

A first region 510 and a second region 525, which are discriminated from each other, are displayed on a display unit 500 of the correspondent party terminal, the message text is displayed on the first region 510, and the user information can be displayed on the second region 525 [S352].

Alternatively, the first region and the second region can be provided to different display units, respectively. For instance, in case that the correspondent party terminal is a folder type terminal having two display units including an outer display unit and an inner display unit, it is able to configure the second region and the first region to be provided to the outer display unit and the inner display unit, respectively.

Accordingly, the present invention provides the following effects and/or advantages.

First of all, according to at least one of the embodiments of the present invention, necessary information differing according to a configuration of a mobile terminal, a data size of a message, a correspondent party of the message or the like can be carried on a message, whereby terminal user's convenience can be considerably enhanced.

It will be apparent to those skilled in the art that various modifications and variations can be specified into other form(s) without departing from the spirit or scope of the inventions.

For instance, the above-embodiments can be configured by being combined with one another. For example, in the second embodiment, although prescribed user information is selected according to a message correspondent party, if there is no empty space of a text of a message, it is able to configure the user information to be sent by avoiding being contained in the message text. And, in the third embodiment, although prescribed user information is selected according to a communication network accessed for sending a message, if there is no empty space of a text of a message, it is able to configure the user information to be sent by avoiding being contained in the message text.

Moreover, although prescribed user information is set for each group of a phonebook in the second embodiment, it is able to configure the present invention to have user information set for each correspondent party listed in the phonebook as well.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a wireless communication unit configured to send an input message, wherein a maximum data size of the input message is limited;
    a memory configured to store at least two user data items prepared in advance by a user;
    a display configured to display the input message;
    an input unit configured to receive the input message prior to sending the input message; and
    a controller configured to:
        select a largest of the at least two user data items having a data size that is a same size or smaller than a remaining data space of the input message;
        add the selected user data item into a data space of the input message in response to a received input;

control the display to concurrently display, on a same screen, the input message, the selected user data item, and a data size of any remaining data space of the input message available for inserting further message input after the selected user data item is added into the data space of the input message; and control the wireless communication unit to transmit the input message including the added selected user data item as a single message.

2. The mobile terminal of claim 1, wherein the at least two user data items comprise message originator identification data.

3. The mobile terminal of claim 1, wherein the data size of each of the at least two user data items differ from each other.

4. The mobile terminal of claim 1, wherein the controller is further configured to automatically select the largest of the at least two user data items and to add the selected one of the at least two user data items into the input message at a completion of the receipt of the input message.

5. The mobile terminal of claim 1, wherein the controller is further configured to receive a determination from a user of whether to transmit the single message.

6. The mobile terminal of claim 1, wherein the controller is further configured to not add one of the at least two user data items into the input message when the remaining data space of the input message is smaller than the data size of each of the at least two user data items.

7. The mobile terminal of claim 6, wherein the controller is further configured to output an indication that none of the at least two user data items is contained in the input message.

8. The mobile terminal of claim 1, wherein the controller is further configured to:
  automatically select the largest of the at least two user data items during the receipt of the input message; and
  add the automatically selected one of the at least two user data items into the input message during the receipt of the input message.

9. The mobile terminal of claim 1, wherein:
  the display includes a first region and a second region, and the controller is further configured to:
    control the display to display the input message in the first region; and
    control the display to display the selected one of the at least two user data items in the second region.

10. A mobile terminal, comprising:
  a wireless communication unit configured to send an input message, the input message having a data size;
  a memory configured to store a phonebook including correspondent parties categorized into groups and store at least two user data items;
  a display configured to display the input message;
  an input unit configured to receive the input message prior to sending the input message; and
  a controller configured to:
    select one of the at least two user data items to be added into a data space of the input message based on the group to which a selected correspondent party belongs;
    add the selected one of the at least two user data items into the input message;
    control the display to concurrently display, on a same screen, the input message, the selected user data iten, and a data size of any remaining data space of the input message available for inserting further message input after the selected user data item is added into the data space of the input message; and
    control the wireless communication unit to transmit the input message including the added selected user data item as a single message,
  wherein a maximum data size of the input message is limited.

11. The mobile terminal of claim 10, wherein the at least two user data items comprise message originator identification data.

12. A mobile terminal, comprising:
  a wireless communication unit configured to send an input message, wherein a data size of the input message is limited;
  a display configured to display the input message, the display having a first region and a second region separate from the first region;
  a memory configured to store at least two user data items;
  an input unit configured to receive the input message prior to sending the input message; and
  a controller configured to:
    select a largest of the at least two user data items having a data size that is a same size or smaller than a remaining data space of the input message;
    add the selected user data item into a data space of the input message in response to a received input;
    control the display to display the input message in the first region;
    control the display to display the selected user data item in the second region;
    control the display to concurrently display, on a same screen, the input message, the selected user data item, and a data size of any remaining data space of the input message available for inserting further message input after the selected user data item is added into the data space of the input message; and
    control the wireless communication unit to transmit the input message including the added selected user data item as a single message.

13. A mobile terminal, comprising:
  a wireless communication unit configured to send an input message, the input message having a data size;
  a memory configured to store a user data item, the user data item comprising text;
  a display configured to display the input message;
  an input unit configured to receive the input message prior to sending the input message; and
  a controller configured to convert the text of the user data item to an image and to insert the image as a background of the input message such that the image is displayed behind the input message.

14. A method of controlling a mobile terminal, the method comprising:
  storing at least two user data items in a memory of the mobile terminal, the at least two user data items prepared in advance by a user;
  displaying a message input by a user on a display of the mobile terminal, wherein a data size of the input message is limited;
  selecting, via a controller of the mobile terminal, a largest of the at least two user data items having a data size that is a same size or smaller than a remaining data space of the input message;
  adding the selected user data item into a data space of the input message in response to a received input;
  concurrently displaying, on a same screen, the input message, the selected user data item, and a data size of any remaining data space of the input message available for inserting further message input after the selected user data item is added into the data space of the input message; and transmitting the input message including the added selected user data item as a single message.

15. The mobile terminal of claim 13, wherein the background is displayed as a watermark of the input message.

* * * * *